(12) United States Patent
Zhang

(10) Patent No.: US 12,022,440 B2
(45) Date of Patent: Jun. 25, 2024

(54) COMMUNICATION METHOD AND APPARATUS

(71) Applicant: HUAWEI TECHNOLOGIES CO., LTD., Guangdong (CN)

(72) Inventor: Lili Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 372 days.

(21) Appl. No.: 17/507,447

(22) Filed: Oct. 21, 2021

(65) Prior Publication Data

US 2022/0046604 A1 Feb. 10, 2022

Related U.S. Application Data

(63) Continuation of application No. PCT/CN2020/081940, filed on Mar. 28, 2020.

(30) Foreign Application Priority Data

Apr. 22, 2019 (CN) .......................... 201910324373.7

(51) Int. Cl.
*H04W 4/00* (2018.01)
*H04L 5/00* (2006.01)
(Continued)

(52) U.S. Cl.
CPC ........... *H04W 72/02* (2013.01); *H04L 5/0051* (2013.01); *H04W 56/001* (2013.01); *H04W 72/0446* (2013.01)

(58) Field of Classification Search
CPC ............... H04W 72/02; H04W 65/001; H04W 72/0446; H04L 5/0051; H04L 5/0053
See application file for complete search history.

(56) References Cited

U.S. PATENT DOCUMENTS 10,952,207 B2\* 3/2021 Lin ................... H04W 72/0446
2014/0355468 A1 12/2014 Li et al.
(Continued)

FOREIGN PATENT DOCUMENTS

CN 102300260 A 12/2011
CN 106576354 A 4/2017
(Continued)

OTHER PUBLICATIONS

Xiaomi Communications, "Add an Intra-UE UL Prioritization Scenario: Resource Conflict between PRACH Channel and Control/Data Channel," 3GPP TSG-RAN2 #105, R2-1901913, Athens, Greece, Feb. 25-Mar. 1, 2019, 2 pages.
(Continued)

*Primary Examiner* — Abdelnabi O Musa
(74) *Attorney, Agent, or Firm* — Fish & Richardson P.C.

(57) ABSTRACT

Example communication methods and apparatus are described. One example method includes obtaining first indication information by a terminal apparatus, where the first indication information is used to indicate a first time domain resource to be used by the terminal apparatus to send or receive first information on a first link. The terminal apparatus obtains second indication information, where the second indication information is used to indicate a second time domain resource to be used by the terminal apparatus to send or receive second information on a second link. When the first time domain resource overlaps with the second time domain resource, the terminal apparatus sends or receives the first information on the first time domain resource, and/or cancels receiving or sending of the second information on the second time domain resource.

20 Claims, 13 Drawing Sheets

(51) Int. Cl.
*H04W 56/00* (2009.01)
*H04W 72/02* (2009.01)
*H04W 72/0446* (2023.01)

(56) References Cited

U.S. PATENT DOCUMENTS

| | | | |
|---|---|---|---|
| 2015/0003391 A1* | 1/2015 | Chen | H04L 5/0044 |
| | | | 370/329 |
| 2017/0303222 A1 | 10/2017 | Lee et al. | |
| 2017/0339511 A1 | 11/2017 | Lee et al. | |
| 2017/0367087 A1 | 12/2017 | Seo | |
| 2019/0200328 A1* | 6/2019 | Tang | H04W 72/12 |
| 2020/0028599 A1* | 1/2020 | Zhang | H04B 7/088 |
| 2020/0077362 A1* | 3/2020 | Liu | H04W 8/24 |
| 2020/0077433 A1* | 3/2020 | Lin | H04L 5/0094 |
| 2020/0092872 A1* | 3/2020 | Lin | H04W 72/0446 |
| 2020/0280993 A1* | 9/2020 | Zhuo | H04W 8/24 |
| 2020/0329471 A1* | 10/2020 | Zhang | H04B 7/0626 |
| 2021/0136744 A1* | 5/2021 | Lu | H04W 72/20 |
| 2021/0211246 A1* | 7/2021 | Xiang | H04W 72/0446 |
| 2021/0337569 A1* | 10/2021 | Fu | H04W 72/569 |
| 2022/0022073 A1* | 1/2022 | Zhang | H04W 72/542 |
| 2022/0046604 A1* | 2/2022 | Zhang | H04L 5/0037 |
| 2022/0070912 A1* | 3/2022 | Lin | H04L 5/0053 |
| 2023/0038791 A1* | 2/2023 | Zhang | H04W 72/0446 |

FOREIGN PATENT DOCUMENTS

| | | | |
|---|---|---|---|
| CN | 108513735 A | 9/2018 | |
| CN | 109075895 A | 12/2018 | |
| CN | 109391994 A | 2/2019 | |
| CN | 109600794 A | 4/2019 | |
| CN | 109600836 A | 4/2019 | |
| CN | 110662304 A | 1/2020 | |

OTHER PUBLICATIONS

3GPP TS 38.133 V15.5.0 (Mar. 2019), "3rd Generation Partnership Project; Technical Specification Group Radio Access Network; NR;Requirements for support of radio resource management(Release 15)," Mar. 2019, 893 pages.

3GPP TS 38.213 V15.5.0 (Mar. 2019), "3rd Generation Partnership Project; Technical Specification Group Radio Access Network; NR;Physical layer procedures for control (Release 15)," Mar. 2019, 104 pages.

3GPP TS 38.214 V15.5.0 (Mar. 2019), "3rd Generation Partnership Project; Technical Specification Group Radio Access Network; NR; Physical layer procedures for data (Release 15)," Mar. 2019, 103 pages.

Office Action issued in Chinese Application No. 201910324373.7 on Apr. 1, 2021, 19 pages (with English translation).

PCT International Search Report and Written Opinion issued in International Application No. PCT/CN2020/081940 on Jun. 19, 2020, 21 pages (with English translation).

EPO Partial Supplementary European Search Report issued in European Application No. 20795488.4 on May 2, 2022, 15 pages.

Huawei, HiSilicon, "Reliability enhancements for NR sidelink broadcast," 3GPP TSG-RAN WG2 #105bis, R2-1904880, Xi'an, China, Apr. 8-12, 2019, 4 pages.

Office Action in Chinese Appln. No. 201910324373.7, dated Sep. 19, 2022, 6 pages (with English translation).

* cited by examiner

| Format (format) | symbol number in a slot (symbol number in a slot) | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |

FIG. 1

| Entry (entry) index | Slot (slot) 1 | Slot (slot) 2 | Slot (slot) 3 | ••• | Slot (slot) m | ••• | Slot (slot) n | ••• | Slot (slot) 256 |
|---|---|---|---|---|---|---|---|---|---|
| 1 | s1 | s2 | s3 | ••• | sm | ••• | | ••• | |
| ooo | | | | ••• | | | | | |
| 122 | s1 | s2 | s3 | ••• | sm | ••• | sn | ••• | s256 |
| ooo | | | | ••• | | | | | |
| 512 | s1 | s2 | s3 | ••• | sm | ••• | | | |

FIG. 2

COMMUNICATION METHOD AND APPARATUS

CROSS-REFERENCE TO RELATED APPLICATIONS

This application is a continuation of International Application No. PCT/CN2020/081940, filed on Mar. 28, 2020, which claims priority to Chinese Patent Application No. 201910324373.7, filed on Apr. 22, 2019. The disclosures of the aforementioned applications are hereby incorporated by reference in their entireties.

TECHNICAL FIELD

The present invention relates to the field of communications technologies, and in particular, to a communication method and an apparatus.

BACKGROUND

In the field of communications technologies, data transmission between terminals or between a terminal and a network device is relatively complex. For example, there are a plurality of communications links between terminals, and different data may be received or sent on different communications links. For another example, some communications systems include both a back-haul link between network devices and an access link between a terminal and a network device, and different data may also be received or sent on these different communications links.

Generally, data is received/transmitted on a transmission resource. Therefore, a same transmission resource may be occupied for receiving/transmitting data on different communications links, resulting in a resource conflict. In this case, how to resolve a conflict between transmission resources of the data on the different communications links is a problem that needs to be urgently resolved.

SUMMARY

The present invention provides a communication method and an apparatus. This manner helps resolve a conflict between transmission resources of data on different links.

According to a first aspect, an embodiment of this application provides a communication method. The method may be performed by a terminal apparatus, and the terminal apparatus may be a terminal or a network device. The method includes: The terminal apparatus obtains first indication information, where the first indication information is used to indicate a first time domain resource to be used by the terminal apparatus to send or receive first information on a first link. The terminal apparatus obtains second indication information, where the second indication information is used to indicate a second time domain resource to be used by the terminal apparatus to send or receive second information on a second link. When the first time domain resource overlaps with the second time domain resource, the terminal apparatus sends or receives the first information on the first time domain resource, and/or the terminal apparatus cancels receiving or sending of the second information on the second time domain resource. Alternatively, when the first time domain resource overlaps with a third time domain resource, the terminal apparatus sends or receives the first information on the first time domain resource, and/or the terminal apparatus cancels receiving or sending of the second information on the second time domain resource, where an end time point of the third time domain resource is a start time point of the second time domain resource. Alternatively, when the first time domain resource overlaps with a third time domain resource, the terminal apparatus sends or receives the first information on the first time domain resource, and/or the terminal apparatus cancels receiving or sending of the second information on the second time domain resource, where an end time point of the third time domain resource is a start time point of the first time domain resource.

In this embodiment of this application, when a transmission resource of the first information on the first link conflicts with a transmission resource of the second information on the second link (that is, the first time domain resource overlaps with the second time domain resource), the terminal apparatus takes corresponding measures. For example, if a priority of the first information on the first link is relatively high, the terminal cancels receiving/transmitting of the second information on the second time domain resource, and receives/transmits the first information on the first time domain resource. This helps resolve a conflict between resources of information on different communications links.

In a possible design, the first time domain resource is at least one first slot, and the second time domain resource is at least one second slot; the first time domain resource is at least one first symbol, and the second time domain resource is at least one second symbol; the first time domain resource is M symbols in at least one first slot, and the second time domain resource is N symbols in at least one second slot, where M is an integer greater than or equal to 1, and N is an integer greater than or equal to 1; the first time domain resource is at least one first slot, and the second time domain resource is at least one second symbol; or the first time domain resource is at least one first symbol, and the second time domain resource is at least one second slot.

It should be understood that the foregoing descriptions are merely examples of the first time domain resource and the second time domain resource, but do not constitute a limitation on the first time domain resource and the second time domain resource.

In a possible design, that the first time domain resource overlaps with the second time domain resource includes: the at least one first slot overlaps with the at least one second slot; the at least one first symbol overlaps with the at least one second symbol; one or more of the M symbols in the at least one first slot overlap with one or more of the N symbols in the at least one second slot; the at least one first slot overlaps with the at least one second symbol; or the at least one first symbol overlaps with the at least one second slot.

In a possible design, that the first time domain resource overlaps with the second time domain resource includes: the first time domain resource completely or partially overlaps with the second time domain resource.

In a possible design, that the first time domain resource overlaps with the third time domain resource includes: the first time domain resource completely or partially overlaps with the third time domain resource.

In a possible design, the first link is a cellular link, and the second link is a sidelink; or the first link is a backhaul link, and the second link is an access link.

In a possible design, the first indication information is used to indicate the first time domain resource to be used by the terminal apparatus to receive the first information on the first link, and the first information includes at least one of the following information: an SS block, a PBCH block, synchronization information, and a CORESET.

In a possible design, the first indication information is used to indicate the first time domain resource to be used by the terminal apparatus to send the first information on the first link, and the first information includes at least one of the following information: information carried on a PRACH, URLLC data, grant-free (grant-free) data, and high QoS data.

In a possible design, the second indication information is used to indicate the second time domain resource to be used by the terminal apparatus to send or receive the second information on the second link, and the second information includes at least one of the following information: information carried on a PSSCH, information carried on a PSCCH, an SL-SRS, an SL-CSI-RS, and information carried on a PSFCH.

In a possible design, the first link is a sidelink, and the second link is a cellular link; or the first link is an access link, and the second link is a backhaul link.

In a possible design, the second indication information is used to indicate the second time domain resource to be used by the terminal apparatus to send the second information on the second link, and the second information includes at least one of the following information: a PSSCH, a PSCCH, an SL-SRS, an SL-CSI-RS, and a PSFCH.

In a possible design, the second indication information is used to indicate the second time domain resource to be used by the terminal apparatus to receive the second information on the second link, and the second information includes at least one of the following information: a PSSCH, a PSCCH, an SL-SRS, an SL-CSI-RS, and a PSFCH.

In a possible design, the first indication information is used to indicate the first time domain resource to be used by the terminal apparatus to send or receive the first information on the first link, and the first information includes at least one of the following information: a PSSCH, a PSCCH, an SL-SRS, an SL-CSI-RS, and a PSFCH.

In a possible design, the second indication information is used to indicate the second time domain resource to be used by the terminal apparatus to send the second information on the second link, and the second information includes at least one of the following information: an SRS, a PUCCH, and a PUSCH.

In a possible design, the second indication information is used to indicate the second time domain resource to be used by the terminal apparatus to receive the second information on the second link, and the second information includes at least one of the following information: a CSI-RS and a DMRS.

In a possible design, the first indication information is sent by the network device or is preconfigured; and the second indication information is sent by the network device or is preconfigured.

In a possible design, the first link is a cellular link or a sidelink in a first communications system, and the second link is a cellular link or a sidelink in a second communications system. The first communications system is an LTE system, and the second communications system is a 5G system; the first communications system is a 5G system, and the second communications system is an LTE system; or the first communications system is a 5G system, and the second communications system is a 5G system.

According to a second aspect, an embodiment of this application further provides a communication method. The method may be performed by a terminal apparatus, and the terminal apparatus may be a terminal or a network device. The method includes: The terminal apparatus obtains first indication information, where the first indication information is used to indicate a first time domain resource to be used by the terminal apparatus to receive or send first information on a first link. The terminal apparatus obtains second indication information, where the second indication information is used to indicate a second time domain resource to be used by the terminal apparatus to receive or send second information on a second link, where the first time domain resource overlaps with the second time domain resource. The terminal apparatus determines whether the terminal apparatus meets a scheduling limitation condition. If the terminal apparatus does not meet the scheduling limitation condition, the terminal apparatus stops measurement based on the second information on the second link, and/or if the terminal apparatus meets the scheduling limitation condition, the terminal apparatus performs measurement based on the second information on the second link. Alternatively, if the terminal apparatus meets the scheduling limitation condition, the terminal apparatus stops measurement based on the second information on the second link, and/or if the terminal apparatus does not meet the scheduling limitation condition, the terminal apparatus performs measurement based on the second information on the second link.

In this embodiment of this application, when a transmission resource of the first information on the first link conflicts with a transmission resource of the second information on the second link (that is, the first time domain resource overlaps with the second time domain resource), the terminal takes different measures based on whether the terminal meets the scheduling limitation condition. For example, when the terminal does not meet the scheduling limitation condition, the terminal stops measurement based on the second information on the second link. When the terminal meets the scheduling limitation condition, the terminal performs measurement based on the second information on the second link. This helps resolve a conflict between transmission resources of information on different communications links.

In a possible design, the first link is a sidelink, and the second link is a cellular link; the first link is a backhaul link, and the second link is an access link, or the first link is an access link, and the second link is a backhaul link.

In a possible design, the first link is a cellular link or a sidelink in a first communications system, and the second link is a cellular link or a sidelink in a second communications system. The first communications system is an LTE system, and the second communications system is a 5G system; the first communications system is a 5G system, and the second communications system is an LTE system; or the first communications system is a 5G system, and the second communications system is a 5G system.

In a possible design, the first link is the sidelink, the first indication information is used to indicate the first time domain resource to be used by the terminal apparatus to receive or send the first information on the first link, and the first information includes at least one of the following information:

data carried on a physical sidelink shared channel PSSCH, data carried on a physical sidelink control channel PSCCH, a sidelink sounding reference signal SL-SRS, a sidelink channel state information reference signal SL-CSI-RS, and a physical sidelink feedback channel PSFCH.

In a possible design, the second information includes at least one of the following information:

a synchronization signal block SS block, a physical broadcast channel block PBCH block, and a CSI-RS.

According to a third aspect, an embodiment of this application further provides a communication method. The method may be performed by a terminal apparatus, and the terminal apparatus may be a terminal or a network device. The method includes: The terminal apparatus obtains first indication information, where the first indication information is used to indicate a first time domain resource to be used by the terminal apparatus to send or receive first information on a first link. The terminal apparatus obtains second indication information, where the second indication information is used to indicate a second time domain resource to be used by the terminal apparatus to send or receive second information on a second link. When the first time domain resource overlaps with the second time domain resource, the terminal apparatus sends or receives, after first duration, the second information on the second time domain resource, and/or the terminal apparatus stops, after first duration, receiving or sending of the first information on the first time domain resource. Alternatively, when the first time domain resource overlaps with the second time domain resource, the terminal apparatus sends or receives, within first duration, the second information on the second time domain resource, and/or the terminal apparatus stops, within first duration, receiving or sending of the first information on the first time domain resource.

In this embodiment of this application, a transmission resource of the first information on the first link conflicts with a transmission resource of the second information on the second link (that is, the first time domain resource overlaps with the second time domain resource), the terminal may wait for the first duration. To be specific, the terminal may send or receive, after the first duration, the second information on the second time domain resource, and/or stop, after the first duration, receiving or sending of the first information on the first time domain resource. Alternatively, the terminal may send or receive, within the first duration, the second information on the second time domain resource, and/or stop, within the first duration, receiving or sending of the first information on the first time domain resource. This helps resolve a conflict between transmission resources of information on different communications links.

In a possible design, that the terminal apparatus stops, after first duration, receiving or sending of the first information on the first time domain resource includes: The terminal apparatus stops, after the first duration, receiving or sending of the first information on an overlapping resource between the first time domain resource and the second time domain resource.

In a possible design, that the terminal apparatus stops, within first duration, receiving or sending of the first information on the first time domain resource includes: The terminal apparatus stops, within the first duration, receiving or sending of the first information on the overlapping resource between the first time domain resource and the second time domain resource.

In a possible design, the first link is a cellular link, and the second link is a sidelink; the first link is a sidelink, and the second link is a cellular link; the first link is a backhaul link, and the second link is an access link; or the first link is an access link, and the second link is a backhaul link.

In a possible design, the first link is a link in a first communications system, and the second link is a link in a second communications system. The first communications system is an LTE system, and the second communications system is a 5G system; the first communications system is a 5G system, and the second communications system is an LTE system; or the first communications system is a 5G system, and the second communications system is a 5G system.

In a possible design, the first duration is first preparation duration of the first information, first preparation duration of the second information, or a minimum value of the first preparation duration and the second preparation duration.

In a possible design, the second link is the sidelink, the second indication information is used to indicate the second time domain resource to be used by the terminal apparatus to send or receive the second information on the second link, and the second information includes at least one of the following information:

data carried on a PSSCH, data carried on a PSCCH, an SL-SRS, an SL-CSI-RS, and a PSFCH.

In a possible design, the first link is the cellular link, the first indication information is used to indicate the first time domain resource to be used by the terminal device to receive the first information on the first link, and the first information includes at least one of the following information:

data carried on a physical downlink shared channel PDSCH, a CSI-RS, and a DMRS.

In a possible design, the first link is the cellular link, the first indication information is used to indicate the first time domain resource to be used by the terminal device to send the first information on the first link, and the first information includes at least one of the following information:

an SRS, data carried on a PUCCH, data carried on a PUSCH, and data carried on a physical random access channel PRACH.

In a possible design, the first information is configured by using higher layer signaling.

In a possible design, the first time domain resource is at least one first slot, and the second time domain resource is at least one second slot; the first time domain resource is at least one first symbol, and the second time domain resource is at least one second symbol; the first time domain resource is M symbols in at least one first slot, and the second time domain resource is N symbols in at least one second slot, where M is an integer greater than or equal to 1, and N is an integer greater than or equal to 1; the first time domain resource is at least one first slot, and the second time domain resource is at least one second symbol; or the first time domain resource is at least one first symbol, and the second time domain resource is at least one second slot.

According to a fourth aspect, an embodiment of this application further provides a communication method. The method may be performed by a terminal apparatus, and the terminal apparatus may be a terminal or a network device. The method includes: The terminal apparatus obtains first indication information, where the first indication information is used to indicate a transmission direction on a first time domain resource. The terminal apparatus obtains second indication information, where the second indication information is used to indicate a second time domain resource to be used by the terminal apparatus to send or receive second information on a second link. If the transmission direction on the first time domain resource is UL on the first link or DL on the first link, when the first time domain resource overlaps with the second time domain resource, the terminal apparatus cancels sending or receiving, on the second time domain resource, of the second information on the second link. If the transmission direction on the first time domain resource is flexible, when the first time domain resource overlaps with the second time domain resource, the terminal apparatus sends or receives, on the second time domain resource, the second information on the second link.

In this embodiment of this application, when the first time domain resource is configured for receiving/transmitting the information on the first link, and the transmission direction is uplink or downlink, if the second time domain resource overlaps with the first time domain resource, and the second time domain resource is configured for receiving/transmitting the information on the second link, the terminal cancels receiving/transmitting, on the second time domain resource, of the information on the second link. This helps resolve a conflict between transmission resources of information on different communications links.

In a possible design, the first link is a cellular link, and the second link is a sidelink; the first link is a sidelink, and the second link is a cellular link; the first link is a backhaul link, and the second link is an access link; or the first link is an access link, and the second link is a backhaul link.

In a possible design, the first link is a link in a first communications system, and the second link is a link in a second communications system. The first communications system is an LTE system, and the second communications system is a 5G system; the first communications system is a 5G system, and the second communications system is an LTE system; or the first communications system is a 5G system, and the second communications system is a 5G system.

In a possible design, the first time domain resource is at least one first slot, and the second time domain resource is at least one second slot; the first time domain resource is at least one first symbol, and the second time domain resource is at least one second symbol; the first time domain resource is M symbols in at least one first slot, and the second time domain resource is N symbols in at least one second slot, where M is an integer greater than or equal to 1, and N is an integer greater than or equal to 1; the first time domain resource is at least one first slot, and the second time domain resource is at least one second symbol; or the first time domain resource is at least one first symbol, and the second time domain resource is at least one second slot.

According to a fifth aspect, an embodiment of this application further provides a communication method. The method may be performed by a terminal apparatus, and the terminal apparatus may be a terminal or a network device. The method includes: The terminal apparatus obtains first indication information, where the first indication information is used to indicate that a transmission direction on a first time domain resource is flexible. The terminal apparatus does not receive/transmit information on the first time domain resource when determining that the following condition is met:

The terminal apparatus does not obtain second indication information, where the second indication information is used to indicate the first time domain resource to be used by the terminal to receive or send information on a sidelink. Alternatively, the terminal apparatus obtains second indication information, where the second indication information does not indicate the terminal apparatus to receive or send, on the first time domain resource, information on a sidelink.

According to a sixth aspect, an embodiment of this application further provides a communication method. The method may be performed by a terminal apparatus, and the terminal apparatus may be a terminal or a network device. The method includes: The terminal obtains first indication information, where the first indication information is used to indicate to receive/transmit, on a first time domain resource, first information on a first link. The terminal cancels a case in which at least one symbol on the first time domain resource is configured for receiving/transmitting second information on a second link.

In a possible design, the first link is a cellular link, and the second link is a sidelink; the first link is a sidelink, and the second link is a cellular link; the first link is a backhaul link, and the second link is an access link; or the first link is an access link, and the second link is a backhaul link.

In a possible design, the first link is a link in a first communications system, and the second link is a link in a second communications system. The first communications system is an LTE system, and the second communications system is a 5G system; the first communications system is a 5G system, and the second communications system is an LTE system; or the first communications system is a 5G system, and the second communications system is a 5G system.

In a possible design, the first information includes one or more of a PDSCH, a CSI-RS, a PUSCH, a PUCCH, a PRACH, or an SRS.

In a possible design, the second information includes at least one of a PSSCH, a PSCCH, an SL-SRS, an SL-CSI-RS, and a PSFCH.

According to a seventh aspect, an embodiment of this application further provides a communication method. The method may be performed by a terminal apparatus, and the terminal apparatus may be a terminal or a network device. The method includes: The terminal apparatus obtains first indication information, where the first indication information is used to indicate a first time domain resource to be used by the terminal to send a PRACH. The terminal obtains second indication information, where the second indication information is used to indicate a second time domain resource to be used by the terminal to send a sidelink synchronization signal block SL-SSB. If the first time domain resource overlaps with the second time domain resource, the terminal cancels sending of the PRACH on the first time domain resource, and sends the SL-SSB on the second time domain resource.

According to an eighth aspect, an embodiment of this application further provides a communication method. The method may be performed by a terminal apparatus, and the terminal apparatus may be a terminal or a network device. The method includes: The terminal apparatus obtains first indication information, where the first indication information is used by the terminal to receive a PDSCH or a CSI-RS on a first time domain resource, or the first indication information is used by the terminal to send a PUSCH, a PUCCH, a PRACH, or an SRS on a first time domain resource. The terminal cancels a case in which a second time domain resource is configured for receiving or sending information on a sidelink, where the first time domain resource overlaps with the second time domain resource.

According to a ninth aspect, an embodiment of this application further provides a terminal apparatus. The terminal apparatus has a function of implementing behavior in the method example according to the first aspect. The function may be implemented by hardware, or may be implemented by hardware executing corresponding software. The hardware or the software includes one or more modules corresponding to the foregoing function. In a possible design, a structure of the apparatus includes a processing unit and a transceiver unit. These units may perform corresponding functions in the method example according to the first aspect. For details, refer to the detailed descriptions in the method example. Details are not described herein again.

According to a tenth aspect, an embodiment of this application further provides a communication apparatus. The apparatus has a function of implementing behavior in the method example according to the second aspect. The function may be implemented by hardware, or may be implemented by hardware executing corresponding software. The hardware or the software includes one or more modules corresponding to the foregoing function. In a possible design, a structure of the apparatus includes a processing unit and a transceiver unit. These units may perform corresponding functions in the method example according to the second aspect. For details, refer to the detailed descriptions in the method example. Details are not described herein again.

According to an eleventh aspect, an embodiment of this application further provides a communication apparatus. The apparatus has a function of implementing behavior in the method example according to the third aspect. The function may be implemented by hardware, or may be implemented by hardware executing corresponding software. The hardware or the software includes one or more modules corresponding to the foregoing function. In a possible design, a structure of the apparatus includes a processing unit and a transceiver unit. These units may perform corresponding functions in the method example according to the third aspect. For details, refer to the detailed descriptions in the method example. Details are not described herein again.

According to a twelfth aspect, an embodiment of this application further provides a communication apparatus. The apparatus has a function of implementing behavior in the method example according to the fourth aspect. The function may be implemented by hardware, or may be implemented by hardware executing corresponding software. The hardware or the software includes one or more modules corresponding to the foregoing function. In a possible design, a structure of the apparatus includes a processing unit and a transceiver unit. These units may perform corresponding functions in the method example according to the fourth aspect. For details, refer to the detailed descriptions in the method example. Details are not described herein again.

According to a thirteenth aspect, an embodiment of this application further provides a communication apparatus. The apparatus has a function of implementing behavior in the method example according to the fifth aspect. The function may be implemented by hardware, or may be implemented by hardware executing corresponding software. The hardware or the software includes one or more modules corresponding to the foregoing function. In a possible design, a structure of the apparatus includes a processing unit and a transceiver unit. These units may perform corresponding functions in the method example according to the fifth aspect. For details, refer to the detailed descriptions in the method example. Details are not described herein again.

According to a fourteenth aspect, an embodiment of this application further provides a communication apparatus. The apparatus has a function of implementing behavior in the method example according to the sixth aspect. The function may be implemented by hardware, or may be implemented by hardware executing corresponding software. The hardware or the software includes one or more modules corresponding to the foregoing function. In a possible design, a structure of the apparatus includes a processing unit and a transceiver unit. These units may perform corresponding functions in the method example according to the sixth aspect. For details, refer to the detailed descriptions in the method example. Details are not described herein again.

According to a fifteenth aspect, an embodiment of this application further provides a communication apparatus. The apparatus has a function of implementing behavior in the method example according to the seventh aspect. The function may be implemented by hardware, or may be implemented by hardware executing corresponding software. The hardware or the software includes one or more modules corresponding to the foregoing function. In a possible design, a structure of the apparatus includes a processing unit and a transceiver unit. These units may perform corresponding functions in the method example according to the seventh aspect. For details, refer to the detailed descriptions in the method example. Details are not described herein again.

According to an eighteenth aspect, an embodiment of this application further provides a communication apparatus. The apparatus has a function of implementing behavior in the method example according to the eighth aspect. The function may be implemented by hardware, or may be implemented by hardware executing corresponding software. The hardware or the software includes one or more modules corresponding to the foregoing function. In a possible design, a structure of the apparatus includes a processing unit and a transceiver unit. These units may perform corresponding functions in the method example according to the eighth aspect. For details, refer to the detailed descriptions in the method example. Details are not described herein again.

According to a nineteenth aspect, an embodiment of this application further provides a communication apparatus. A structure of the communication apparatus includes a processor and a memory, and the processor is configured to support the terminal apparatus in performing corresponding functions in the methods according to the first aspect to the eighth aspect. The memory is coupled to the processor and stores program instructions and data that are necessary for the communication apparatus. The structure of the communication apparatus further includes a communications interface, configured to communicate with another device.

According to a twentieth aspect, this application further provides a computer-readable storage medium. The computer-readable storage medium stores instructions, and when the instructions are on a computer, the computer is enabled to perform all or some of the steps in the methods according to the first aspect to the eighth aspect.

According to a twenty-first aspect, this application further provides a computer program product including instructions. When the computer program product runs on a computer, the computer is enabled to perform all or some of the steps in the methods according to the first aspect to the eighth aspect.

According to a twenty-second aspect, this application further provides a communication apparatus, for example, a chip system. The communication apparatus is connected to a memory, and is configured to: read and execute a software program stored in the memory, to perform all or some of the steps in the methods according to the first aspect to the eighth aspect

BRIEF DESCRIPTION OF DRAWINGS

FIG. 1 is a schematic diagram of a slot format according to an embodiment of the present invention;

FIG. 2 is a schematic diagram of a slot format combination according to an embodiment of the present invention;

DESCRIPTION OF EMBODIMENTS

Figures 3, 4:
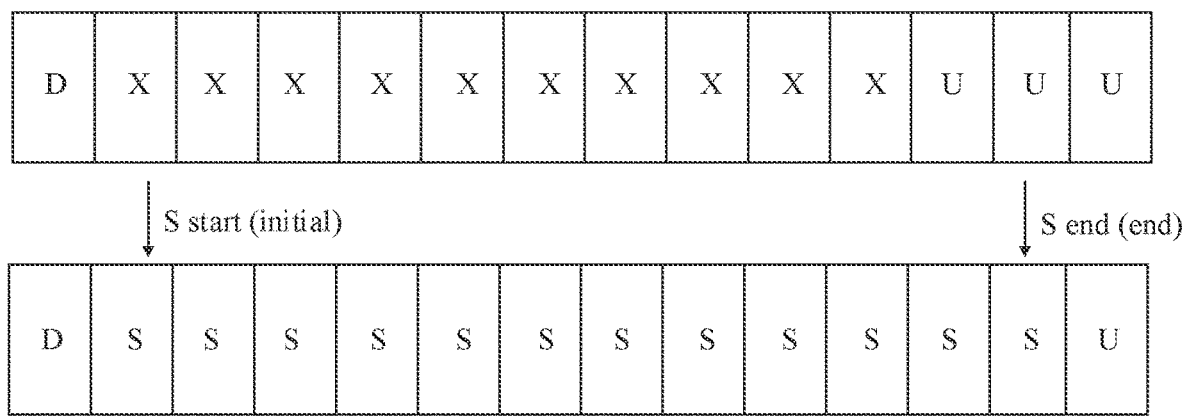
FIG. 3 is a schematic diagram of a slot format combination according to an embodiment of the present invention.
FIG. 4 is a schematic diagram of a slot format according to an embodiment of the present invention.

The following describes the technical solutions in the embodiments of the present invention with reference to the accompanying drawings in the embodiments of the present invention.

The technical solutions in the embodiments of this application may be applied to various communications systems, for example, a wideband code division multiple access (wideband code division multiple access, WCDMA) mobile communications system, an evolved universal terrestrial radio access network (evolved universal terrestrial radio access network, E-UTRAN) system, a next generation radio access network (next generation radio access network, NG-RAN) system, a long term evolution (long term evolution, LTE) system, a worldwide interoperability for microwave access (worldwide interoperability for microwave access, WiMAX) communications system, a future 5th generation (5th Generation, 5G) system, such as a new radio access technology (new radio access technology, NR), and a future communications system, such as a 6G system.

A service scenario (or an application scenario) described in the embodiments of this application is intended to describe the technical solutions in the embodiments of this application more clearly, and do not constitute a limitation on the technical solutions provided in the embodiments of this application. A person of ordinary skill in the art may know that with emergence of a new service scenario, the technical solutions provided in the embodiments of this application are also applicable to similar technical problems.

In addition, the term "for example" in the embodiments of this application is used to represent giving an example, an illustration, or a description. Any embodiment or implementation solution described as an "example" in this application should not be explained as being more preferred or having more advantages than another embodiment or implementation solution. Exactly, the term "example" is used to present a concept in a specific manner.

The following describes some terms in the embodiments of this application, to facilitate understanding for a person skilled in the art.

(1) Terminal (terminal): The terminal includes a device that provides a user with voice and/or data connectivity, for example, may include a handheld device with a wireless connection function or a processing device connected to a wireless modem. The terminal may communicate with a core network through a radio access network (radio access network, RAN), and exchange a voice and/or data with the RAN. The terminal may include user equipment (user equipment, UE), a wireless terminal, a mobile terminal, a subscriber unit (subscriber unit), a subscriber station (subscriber station), a mobile station (mobile station), a mobile (mobile) console, a remote station (remote station), an access point (access point, AP), a remote terminal (remote terminal), an access terminal (access terminal), a user terminal (user terminal), a user agent (user agent), a user device (user device), or the like. For example, the terminal may include a mobile phone (or referred to as a "cellular" phone), a computer having a mobile terminal, a portable, pocket-sized, handheld, computer built-in mobile apparatus, or a smart wearable device. For example, the terminal may be a device such as a personal communications service (personal communications service, PCS) phone, a cordless telephone set, a session initiation protocol (session initiation protocol, SIP) phone, a wireless local loop (wireless local loop, WLL) station, or a personal digital assistant (personal digital assistant, PDA). The terminal further includes a limited device, for example, a device with low power consumption, a device with a limited storage capability, or a device with a limited computing capability. For example, the terminal includes an information sensing device such as a barcode, a radio frequency identification (radio frequency identification, RFID) device, a sensor, a global positioning system (global positioning system, GPS), or a laser scanner.

As an example instead of a limitation, in the embodiments of this application, the terminal may alternatively be a wearable device. The wearable device may also be referred to as a wearable intelligent device, and is a general term for wearable devices such as glasses, gloves, watches, clothes, and shoes, that are developed by applying wearable technologies in intelligent designs of daily wear. The wearable device is a portable device that is directly worn on a body or integrated into clothes or an accessory of the user. The wearable device is not only a hardware device, but is used to implement a powerful function through software support, a data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

However, if the various terminals described above are located on a vehicle (for example, placed in the vehicle or installed in the vehicle), the terminals may be considered as vehicle-mounted terminals. For example, the vehicle-mounted terminal is also referred to as an on board unit (on board unit, OBU).

(2) Network device: For example, the network device includes an access network (access network, AN) device, for example, a base station (for example, an access point), and may be a device that communicates with a wireless terminal over an air interface by using one or more cells in an access network. Alternatively, for example, a network device in a V2X technology is a road side unit (road side unit, RSU). The base station may be configured to mutually convert a received over-the-air frame and an internet protocol (IP) packet, and serve as a router between the terminal and a rest portion of the access network. The rest portion of the access network may include an IP network. The RSU may be a fixed infrastructure entity that supports a V2X application, and may exchange a message with another entity that supports the V2X application. The network device may further coordinate attribute management of the air interface. For example, the network device may include an evolved NodeB (NodeB, eNB, or e-NodeB, evolved NodeB) in a long term evolution (long term evolution, LTE) system or an LTE-advanced (LTE-Advanced, LTE-A) system, may include a next generation NodeB (next generation NodeB, gNB) in a 5G NR system, may include a centralized unit (centralized unit, CU) and a distributed unit (distributed unit, DU) in a cloud radio access network (cloud radio access network, Cloud RAN) system, or may include a base station in any new generation system such as 6G. This is not limited in the embodiments of this application.

(3) User to network interface universal (user to network interface universal, Uu): The user to network interface universal is briefly referred to as a Uu interface, and is an interface between a terminal and a network device for wireless communication. The terminal accesses a communications system through the Uu interface, and the Uu interface is mainly used for broadcast, paging, and RRC connection processing.

(4) Cellular link: The cellular link is a link on which a terminal communicates with a network device through a Uu interface. In this application, the cellular link (cellular link) may alternatively be replaced with a main link (main link), a Uu link, a non-sidelink, or the like.

(5) Sidelink (sidelink): The sidelink may also be referred to as a sidelink, a secondary link, or the like. The name is not limited in the embodiments of this application. In a V2X scenario, the sidelink is a direct link connection between two V2X terminals, and the V2X terminal is a terminal with a V2X function.

(6) SL transmission: Data transmission between two V2X terminals on a sidelink is referred to as SL transmission.

Before performing SL transmission, the two V2X terminals may establish a sidelink connection. For example, the V2X terminal used as an initiator sends, to a network device, a request for establishing a sidelink connection. If the network device agrees that the V2X terminal establishes the sidelink connection, the network device sends, to the V2X terminal, configuration information for establishing the sidelink connection, and the V2X terminal establishes a sidelink connection to another V2X terminal based on the configuration information sent by the network device. In this application, the sidelink may alternatively be replaced with a sidelink or a supplementary link (supplementary link).

(7) Resource: The resource may also be referred to as a transmission resource, and includes any one or a combination of a plurality of a time domain resource, a frequency domain resource, a time-frequency resource, a space domain resource, or the like.

It should be noted that after establishing a sidelink, two V2X terminals may perform SL transmission on a specific transmission resource, and there are two resource selection manners. For example, a network device allocates an SL transmission resource to a terminal. For another example, the terminal autonomously selects an SL transmission resource. The terminal may select the SL transmission resource from a configured resource pool based on interference detection. In this application, "configuration" may mean that the network device sends the resource by using signaling or the resource is preconfigured. That the network device sends the resource by using signaling includes: sending the resource to the terminal apparatus by using at least one of RRC signaling, MAC signaling, or physical layer signaling. That the resource is preconfigured includes: configuring the resource through OAM, or presetting the resource in the terminal/network device.

(8) Time unit: A time domain resource includes one or more time units, and the time unit may be a radio frame, a subframe, a slot, a symbol, or the like. One radio frame may include a plurality of subframes, one subframe may include one or more slots (slots), and one slot may include at least one symbol (symbol). Alternatively, one radio frame may include a plurality of slots, and one slot may include at least one symbol.

In 5G NR, one slot may include at least one of a symbol used for downlink transmission, a flexible symbol, a symbol used for uplink transmission, and the like. In this way, compositions of the slot are referred to as different slot formats (slot formats, SFs), and there may be a maximum of 256 slot formats. The flexible symbol may be used as a guard period GP. FIG. 1 provides examples of several possible slot formats. It can be learned from FIG. 1 that each symbol in a slot may be in three states: uplink (uplink, UL), downlink (downlink, DL), and unknown (unknown), which are denoted as UL (U)/DL (D)/X. X is referred to as unknown or flexible (flexible) (the flexible symbol may also be referred to as an F symbol). The terminal performs neither receiving nor sending on a corresponding symbol. Optionally, the terminal may perform corresponding detection on the X symbol.

In addition, it can be learned from FIG. 1 that slots in different slot formats may differ in any one of a quantity of uplink symbols included in the slots, a quantity of downlink symbols included in the slots, a quantity of flexible symbols included in the slots, or a quantity of guard period symbols included in the slots.

A slot may have different slot types, and the different slot types include different quantities of symbols. For example, a mini slot (mini slot) includes fewer than seven symbols, and a common slot (slot) includes seven symbols or 14 symbols. Based on different subcarrier spacing, symbol lengths may be different. Therefore, slot lengths may be different.

In 5G NR, a slot aggregation technology is further introduced. To be specific, the network device may allocate a plurality of slots to a same terminal for data transmission.

For example, the terminal may perform uplink data scheduling in a plurality of allocated slots, for example, scheduling on a physical uplink shared channel (physical uplink shared channel, PUSCH), or may perform downlink data scheduling in a plurality of allocated slots, for example, scheduling on a physical downlink shared channel (physical Downlink Shared Channel, PDSCH).

It should be noted that the slot in the embodiments of this application may be any one of the foregoing slots.

(9) Semi-static or dynamic slot format configuration: 5G NR supports the semi-static slot format configuration. Semi-static signaling indicates that a slot format (which may be one or more slot formats of one or more slots) in a time period or a period is notified by using radio resource control (radio resource control, RRC) signaling. For example, the RRC signaling is used to indicate that each symbol in the one or more slots is in a UL state, a DL state, or an unknown state.

There are two types of semi-static signaling. One is cell-specific semi-static signaling, that is, the signaling is configured for all terminals in a cell, and all the terminals in the cell receive the signaling. The other is UE-specific semi-static signaling, that is, the signaling is configured for a terminal in a cell, and only the terminal receives the signaling, which is also referred to as dedicated signaling (dedicated signaling).

5G NR also supports the dynamic slot format configuration. For example, a slot format (which may be one or more slot formats of one or more slots) in a period is notified by using downlink control information (downlink control information, DCI) signaling. The DCI signaling is referred to as a dynamic slot format indicator (slot format indicator, SFI), and may be delivered by using DCI 2_0.

(10) SFI indicator: The SFI indicator is an SFI indicator on a cellular link. The SFI indicator may be used to indicate that one or more transmission directions on one or more symbols in at least one slot are downlink, uplink, or flexible, so that a terminal receives/transmits data in the slot indicated by the SFI indicator or on the symbol indicated by the SFI indicator.

In addition, several symbol state combinations of a plurality of slots are predefined in NR, and a table within which the combinations fall is referred to as a UE-specific table (UE-specific table). For example, a base station may configure (for example, configure through RRC) a group of slot format combinations in one or more slots. An entry index (entry ID) of the combination may be used to indicate a specific slot format combination. For example, an entry ID 1 in the table indicates the first group of slot format combinations. In the table, a maximum entry ID is 512, and a maximum quantity of slots included in a slot format combination corresponding to each entry ID is 256. The base station may dynamically indicate the slot format combinations in the one or more slots by using DCI signaling. A format of the DCI signaling may be DCI 2_0, DCI 1_0, or the like.

For example, FIG. 2 is a schematic diagram of an entry ID and a slot format combination. The network device may deliver a table by using RRC signaling. The table includes a configured entry ID and a slot format combination corresponding to each entry ID. A horizontal axis represents different slots in the combination, and a vertical axis represents an entry index (entry ID). For example, a slot format combination for which an entry ID is an entry ID 1 includes S1 to Sm, that is, a combination of 1 to m slot formats in 256 slot formats, where m is less than 256.

Then, the network device may indicate, by using different dynamic SFIs, the terminal to correspondingly configure a slot format combination corresponding to an entry ID in the table. For example, the network device sends DCI to the terminal, where the DCI carries the entry ID. The terminal may determine, in the table shown in FIG. 2, the slot format combination corresponding to the entry ID carried in the SFI indicator.

In an example, as shown in FIG. 3, the DCI is carried on a GC-PDCCH, each SFI index carried in the DCI is an entry ID corresponding to a slot format combination, and a total of 16 SFI indexes in a cell may be carried. The network device may configure the terminal to detect the GC-PDCCH and receive an information indication of the SFI at a specific interval. This time period is referred to as a monitor period.

Therefore, a general SFI indicator may be further used to indicate several symbol state combinations of a plurality of slots, that is, indicate an entry ID.

(11) Sidelink slot configuration (SL slot configuration): The sidelink slot configuration is used to indicate a sidelink slot format (Sidelink slot format, SL slot format). The sidelink slot configuration/indication may be similar to that in an NR technology. For example, the sidelink slot configuration/indication includes semi-static and dynamic sidelink slot configurations. Specifically, the semi-static sidelink slot configuration indicates that a slot format in a time period or a period is notified by using RRC signaling, that is, any one or a combination of a plurality of an SL state, a UL state on a Uu interface, a DL state on a Uu interface, or a flexible (flexible) state on a Uu interface. The slot format is one or more slot formats of one or more slots. Alternatively, the sidelink slot configuration is used to indicate one or more slots in which SL data is sent or received. In other words, the SL data is received or sent in a slot corresponding to the SL slot format configuration.

There are two types of semi-static signaling. One is cell-specific semi-static signaling, that is, the signaling is configured for an entire cell (for example, represented as TDD-UL-DL-ConfigCell-SL or TDD-UL-DL-SL-Config-Cell), and all terminals in the cell receive the configuration. The other is UE-specific semi-static signaling, that is, the signaling is configured for specific UE, and may be UE dedicated signaling (for example, represented as TDD-UL-DL-ConfigDedicated-SL or TDD-UL-DL-SL-ConfigDedicated). For example, refer to FIG. 4. The first row lists an NR-general cell-specific semi-static slot format configuration, and the second row lists that an X symbol or a U symbol is further identified as an S symbol for SL transmission, that is, an SL-cell-specific TDD configuration, based on the NR-general cell-specific semi-static slot format configuration. When the SL-cell-specific TDD configuration shown in the second row is configured, a start symbol and continuous symbols may be further indicated, so that X symbols or U symbols on the start symbol and the continuous symbols are overwritten as S symbols for SL transmission. When the SL-cell-specific TDD configuration shown in the second row is configured, a start symbol and an end symbol may be further indicated, so that an X symbol or a U symbol between the start symbol and the end symbol is overwritten as an S symbol for SL transmission.

Optionally, the cell-specific semi-static SL slot format configuration in the foregoing example may alternatively be replaced with a UE-specific semi-static SL slot format configuration indicated by the UE dedicated signaling.

In this application, the sidelink slot configuration may also be referred to as a sidelink (SL) slot format configuration. To be specific, the SL slot format configuration includes the cell-specific semi-static SL slot format configuration and the UE-specific semi-static SL slot format configuration. In this application, "specific (specific)" may also be replaced with "dedicated (dedicated)".

In an IAB scenario, the sidelink slot configuration may be replaced with an access/backhaul link slot (format) configuration accordingly. Correspondingly, the access/backhaul link slot (format) configuration includes a cell-specific semi-static access/backhaul link slot format configuration and a UE-specific semi-static access/backhaul link slot format configuration. Specifically, the semi-static access/backhaul link slot configuration indicates that a slot format in a time period or a period is notified by using RRC signaling, that is, any one or a combination of a plurality of a UL/DL/flexible (flexible) state of an access link (access link) and a UL/DL/flexible (flexible) state of a backhaul link (backhaul link). The slot format is one or more slot formats of one or more slots. Alternatively, the access/backhaul link slot configuration is used to indicate one or more slots in which access link/backhaul link data is sent or received. In other words, the access link/backhaul link data is received or sent in a slot corresponding to the access/backhaul link slot format configuration.

Specifically, the dynamic sidelink slot configuration may be represented as an SL-SFI or an SFI-SL. In 5G NR, based on the notification of the general SFI (the foregoing SFI indicator), a sidelink SFI, namely, the SL-SFI, may be further notified. For example, refer to FIG. 4. The first row lists an NR-general SFI, and the second row lists that an X symbol or a U symbol is further identified as an S symbol for SL transmission, that is, an SL-SFI, based on the NR-general SFI. When the SL-SFI shown in the second row is configured, a start symbol and continuous symbols may be further indicated, so that X symbols or U symbols on the start symbol and the continuous symbols are overwritten as S symbols for SL transmission. When the SL-SFI shown in the second row is configured, a start symbol and an end symbol may be further indicated, so that an X symbol or a U symbol between the start symbol and the end symbol is overwritten as an S symbol for SL transmission.

It should be noted that the SL-SFI may alternatively be used to indicate one slot or at least one symbol in one slot, may be used to indicate at least one symbol in at least one slot, or may be used to indicate several symbol state combinations of a plurality of slots, that is, indicate an entry ID, so that the terminal transmits data in the slot indicated by the DCI or on the symbol indicated by the DCI.

Further, S may identify a sidelink transmission (sidelink transmission, SL Tx for short) state or a sidelink reception (sidelink reception, SL Rx) state. Details are not described herein.

(12) Terms: The terms "system" and "network" may be used interchangeably in the embodiments of this application. "A plurality of" means two or more. In view of this, "a plurality of" may also be understood as "at least two" in the embodiments of this application. The term "at least one" may be understood as one or more, for example, understood as one, two, or more. For example, "include at least one" means including one, two, or more, and does not limit which items are included. For example, if at least one of A, B, and C is included, A, B, C, A and B, A and C, B and C, or A, B, and C may be included. Similarly, understanding of descriptions such as "at least one type" is similar. The term "and/or" describes an association relationship for describing associated objects and indicates that three relationships may exist. For example, A and/or B may indicate the following three cases: Only A exists, both A and B exist, and only B exists.

In addition, unless otherwise specified, the character "/" usually indicates an "or" relationship between associated objects.

Unless otherwise stated on the contrary, ordinal numerals such as "first" and "second" in the embodiments of this application are used to distinguish between a plurality of objects, and are not intended to limit a sequence, a time sequence, a priority, or an importance degree of the plurality of objects. For example, a first time domain resource and a second time domain resource are merely intended to distinguish between different time domain resources, but are not intended to limit priorities, importance, or the like of the two time domain resources.

Application scenarios related to the embodiments of this application are described below.

A communication method provided in the embodiments of this application may be applied to a vehicle-to-everything (vehicle-to-everything, V2X) scenario. V2X specifically further includes four application scenarios: vehicle-to-vehicle (Vehicle-to-Vehicle, V2V), vehicle-to-pedestrian (Vehicle-to-Pedestrian, V2P), vehicle-to-infrastructure (Vehicle-to-Infrastructure, V2I), and vehicle-to-network (Vehicle-to-Network, V2N). V2V refers to LTE-based vehicle-to-vehicle communication. V2P refers to LTE-based vehicle-to-person (including a pedestrian, a cyclist, a driver, or a passenger) communication. V2I refers to LTE-based vehicle-to-road side unit (RSU) communication. V2N refers to LTE-based vehicle-to-base station/network communication.

Figure 5:
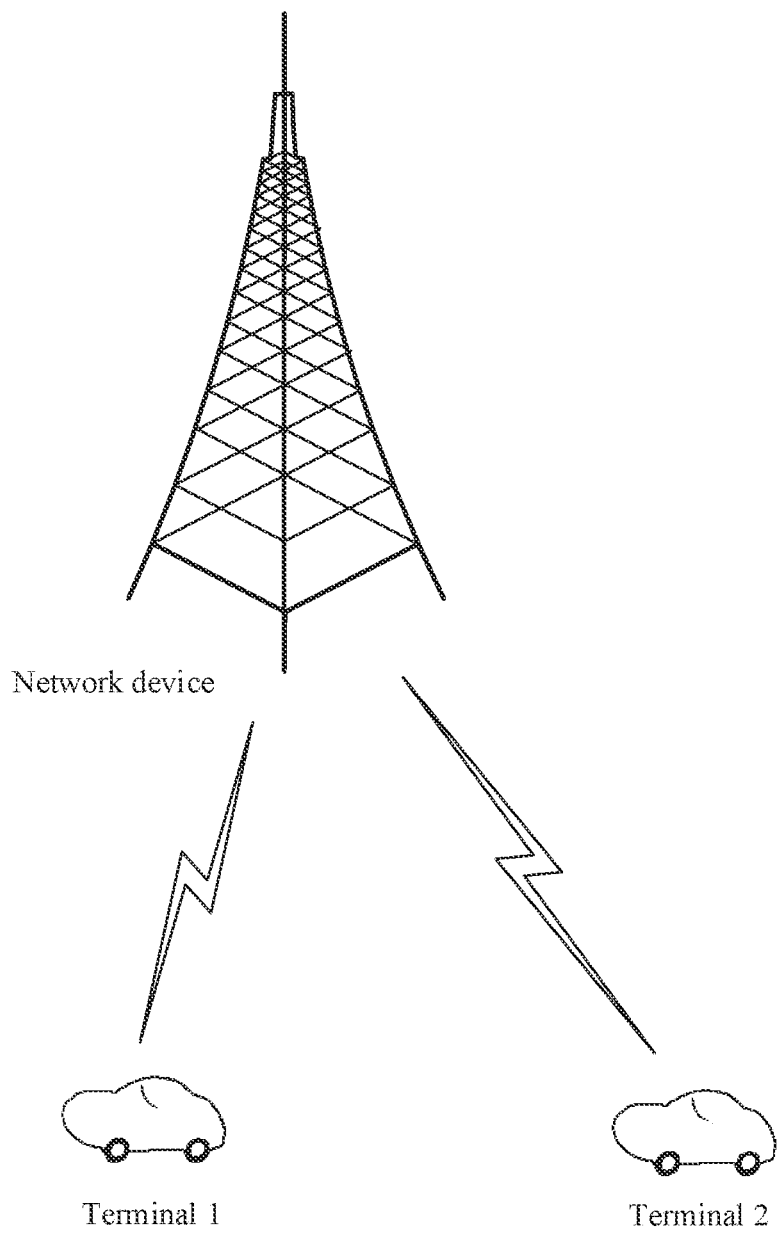
FIG. 5 is a schematic diagram of an application scenario according to an embodiment of the present invention.

FIG. 5 is a schematic diagram of an application scenario according to an embodiment of this application. The application scenario shown in FIG. 5 is a V2N scenario. The scenario includes a network device, a terminal 1, and a terminal 2. The terminal 1 (or the terminal 2) and the network device may communicate through a cellular link and a sidelink (sidelink).

It should be noted that the network device in FIG. 5 is, for example, an access network device, for example, a base station. The access network device corresponds to different devices in different systems. For example, the access network device may correspond to an eNB in the 4th generation (4th generation, 4G) system, and correspond to a 5G access network device, for example, a gNB, in the 5G system. For example, the terminal in FIG. 5 is a vehicle-mounted terminal or a vehicle. However, the terminal in this embodiment of this application is not limited thereto.

Data transmission between the network device and the terminal is relatively complex, and data on a sidelink and data on a cellular link may occupy a same transmission resource. Therefore, an embodiment of this application provides a communication method, to resolve a conflict between resources on the sidelink and the cellular link.

Certainly, this embodiment of this application is further applicable to another application scenario, for example, an integrated access and backhaul (Integrated access and backhaul, IAB) scenario. In the IAB scenario, there is an access link between a terminal and a network device, and there is a backhaul link between network devices. Therefore, an entire system includes both the access link between the terminal and the network device and the backhaul link between the network devices. There is a conflict between sending on the backhaul link by a network device and receiving on the access link by the network device. Similarly, there is also a conflict between receiving on the backhaul link by a network device and sending on the access link by the network device. Alternatively, there is a conflict in sending on both the backhaul link and the access link by a network device. Alternatively, there is a conflict in receiving on both the backhaul link and the access link by a network device. The sending/receiving are performed on a same resource. Therefore, the communication method provided in this embodiment of this application can also resolve a resource conflict in data receiving/transmitting on the access link and the backhaul link in the IAB scenario.

Because both the network device and the terminal receive/transmit data on different communications links, both the network device and the terminal face a problem of a resource conflict. A terminal apparatus is used as an example below for description. It should be noted that the terminal apparatus may be a terminal or a network device. To be specific, the following method procedure may be performed by the terminal or the network device. It should be understood that the following terminal apparatus may be an entire terminal or an entire network device, a component or a combination of a plurality of components that can perform the following method procedure in the terminal or the network device, may be a chip that can implement the following method procedure in the terminal or the network device, or the like. This is not limited in this embodiment of this application.

It should be noted that the communication method provided in this embodiment of this application can further resolve a resource conflict in information transmission between different communications systems. When the terminal communicates with the network device, data communication in a plurality of communications systems may be supported. Therefore, there may be a resource conflict between receiving/transmitting data on a link in a first communications system by a terminal and receiving/transmitting data on a link in a second communications system by the terminal. Specifically, a plurality of cases are included. For example, there may be a resource conflict between receiving/transmitting data on a cellular link in the first communications system by a terminal and receiving/transmitting data on a cellular link in the second communications system by the terminal; there may be a resource conflict between receiving/transmitting data on a sidelink in the first communications system by a terminal and receiving/transmitting data on a sidelink in the second communications system by the terminal; there may be a resource conflict between receiving/transmitting data on a cellular link in the first communications system by a terminal and receiving/transmitting data on a sidelink in the second communications system by the terminal, there may be a resource conflict between receiving/transmitting data on a sidelink in the first communications system by a terminal and receiving/transmitting data on a cellular link in the second communications system by the terminal, there may be a resource conflict between receiving/transmitting data on an access link in the first communications system by a terminal and receiving/transmitting data on an access link in the second communications system by the terminal; there may be a resource conflict between receiving/transmitting data on a backhaul link in the first communications system by a terminal and receiving/transmitting data on a backhaul link in the second communications system by the terminal; there may be a resource conflict between receiving/transmitting data on an access link in the first communications system by a terminal and receiving/transmitting data on a backhaul link in the second communications system by the terminal; or there may be a resource conflict between receiving/transmitting data on a backhaul link in the first communications system by a terminal and receiving/transmitting data on an access link in the second communications system by the terminal. In this application, data receiving/transmitting is data sending or receiving.

The first communications system may be an LTE system, and the second communications system may be a 5G system; the first communications system is a 5G system, and the second communications system is an LTE system; the first communications system may be a 5G system, and the second communications system may be a 5G system; or the first communications system may be an LTE system, and the second communications system may be an LTE system. Certainly, the 5G system may alternatively be replaced with a new radio (new radio, NR) system. This is not limited in this embodiment of this application.

In this application, when one of the first communications system and the second communications system is an LTE system and the other is a 5G system, a priority of data receiving/transmitting in the LTE system may be higher than a priority of data receiving/transmitting in the 5G system. Considering that a configuration of the LTE system is less flexible than a configuration of the 5G system, and therefore a higher priority in LTE can ensure that an LTE service is preferentially guaranteed. Certainly, a priority of data receiving/transmitting in the 5G system may alternatively be higher than a priority of data receiving/transmitting in the LTE system. It should be understood that in all cases of data receiving/transmitting in different communications systems, a resource conflict in data receiving/transmitting in the different communications systems can be resolved by using the technical solutions provided in this application.

In this application, when one of a first link and a second link is an access link and the other is a backhaul link, a priority of data receiving/transmitting on the backhaul link may be higher than a priority of data receiving/transmitting on the access link. Considering that impact of data receiving/transmitting on the backhaul link is greater than impact of data receiving/transmitting on the access link on the entire system, and therefore a higher priority on the backhaul link can ensure that a key service of the system is preferentially guaranteed. Certainly, a priority of data receiving/transmitting on the access link may alternatively be higher than a priority of data receiving/transmitting on the backhaul link. In all cases of data receiving/transmitting on different communications links, a resource conflict in data receiving/transmitting on the different communications links can be resolved by using the technical solutions provided in this application.

Certainly, specifically, first information on the first link and second information on the second link further need to be considered based on priorities of the first information and the second information. A priority of transmitting a PRACH/synchronization information is usually higher than a priority of transmitting a normal PDSCH/PUSCH, and the like. For details, refer to a case in which data priorities of the first information and the second information are compared when a cellular link and a sidelink are used as an example in the following scenario. Whether to receive/transmit the first information/the second information and whether to cancel receiving/transmitting of the first information/the second information based on the comparison between the data priorities of the first information and the second information are also applicable to the different communications systems and the different types of links. Extensions may be performed, and belong to content covered in this application. Details are not described again.

It should be noted that a V2X scenario is used as an example below for description, and a time domain resource is also used as an example below for description. The time domain resource may be replaced with a time-frequency resource, or may be replaced with any one or a combination of a plurality of the foregoing resources.

The following describes, with reference to the accompanying drawings, the technical solutions provided in the embodiments of this application.

Embodiment 1

Figure 6:
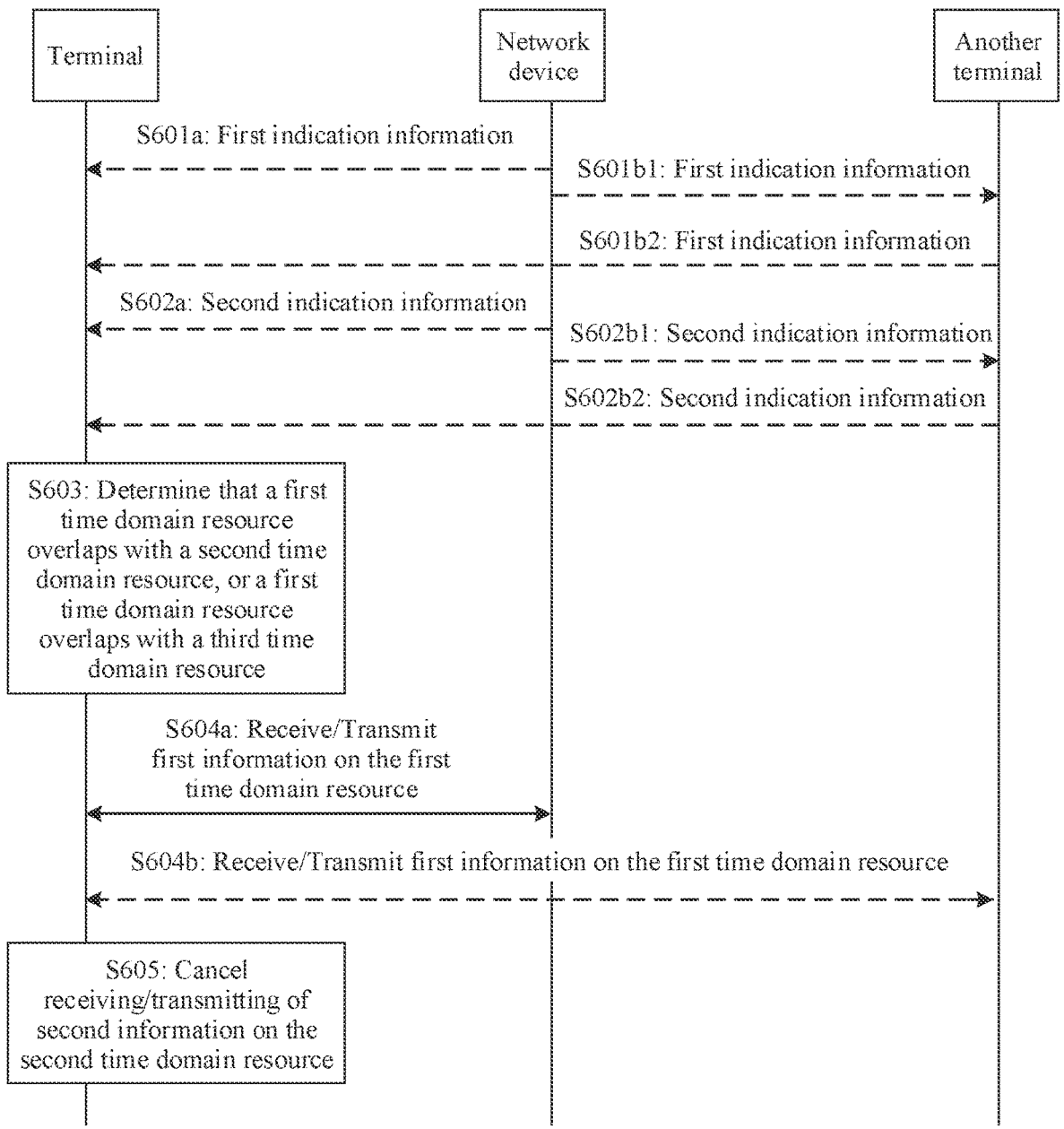
FIG. 6 is a schematic diagram of a procedure of a communication method according to an embodiment of the present invention.

FIG. 6 is a diagram of a procedure of a communication method according to an embodiment of this application. The method may be performed by the terminal or the network device in the application scenario shown in FIG. 5. Descriptions are provided below by using an example in which the terminal performs the method. As shown in FIG. 6, the method includes the following steps.

S601: The terminal obtains first indication information, where the first indication information is used to indicate a first time domain resource to be used by the terminal apparatus to send or receive first information on a first link.

It should be noted that, it can be learned from the foregoing content that a resource of the terminal may be allocated by the network device, or may be determined by the terminal based on preconfiguration. If the resource is allocated by the network device, S601 includes two cases. Case 1: The terminal receives the first indication information from the network device (referring to S601a in FIG. 6). Case 2: The terminal may also receive the first indication information from another terminal. For example, the network device sends the first indication information to the another terminal, and the another terminal forwards the first indication information to the terminal (referring to S601b1 and S601b2 in FIG. 6). If the resource is determined by the terminal based on preconfiguration, S601 may be that the terminal determines the first indication information based on preconfiguration, or the first indication information is preconfigured. Whether the first indication information is obtained from the network device or the another terminal or is preconfigured is not limited in this embodiment of this application. Therefore, in FIG. 6, S601a, S601b1, and S601b2 are represented by dashed lines.

In an example, the first indication information may be scheduling information, that is, the first indication information is used to indicate the first time domain resource to be used by the terminal to receive or send the first information. The scheduling information may be downlink grant information or uplink grant information. Specifically, when the first indication information is the downlink grant information, the downlink grant information is used to indicate the terminal to receive the first information on the first time domain resource. When the first indication information is the uplink grant information, the uplink grant information is used to indicate the terminal to send the first information on the first time domain resource. In an example, the first indication information may alternatively indicate the first time domain resource, and the first time domain resource is used to receive or send the first information on the first link. In another example, the first indication information may be higher layer signaling, that is, RRC signaling.

S602: The terminal obtains second indication information, where the second indication information is used to indicate a second time domain resource to be used by the terminal apparatus to receive or send second information on a second link.

It should be noted that an execution sequence between S601 and S602 is not limited in this embodiment of this application. S601 may be performed before S602, or S602 may be performed before S601.

It should be understood that S602 may alternatively include two cases. Case 1: The terminal receives the second indication information from the network device (referring to S602a in FIG. 6). Case 2: The terminal may also receive the second indication information from another terminal. For example, the network device sends the second indication information to the another terminal, and the another terminal forwards the second indication information to the terminal (referring to S602b1 and S602b2 in FIG. 6). If the resource is determined by the terminal based on preconfiguration, S602 may be that the terminal determines the second indication information based on preconfiguration, or the second indication information is preconfigured. Whether the second indication information is obtained from the network device or the another terminal or is preconfigured is not limited in this embodiment of this application. Therefore, in FIG. 6, S602a, S602b1, and S602b2 are represented by dashed lines.

Therefore, both the first time domain resource and the second time domain resource may be allocated by the network device; both the first time domain resource and the second time domain resource may be determined by the terminal based on preconfiguration; the first time domain resource is allocated by the network device, and the second time domain resource is determined by the terminal based on preconfiguration; or the first time domain resource is determined by the terminal based on preconfiguration, and the second time domain resource is allocated by the network device. This is not limited in this embodiment of this application.

In this application, that the resource is determined by the terminal based on preconfiguration may mean that the resource is preconfigured for the terminal. That the resource is determined by the network device based on preconfiguration may mean that the resource is preconfigured for the network device. Preconfiguration includes configuration through operation, administration, and management (operation, administration, and management, OAM). For example, that the resource is preconfigured for the terminal may mean that the resource is preconfigured for the terminal through OAM. That the resource is preconfigured for the network device may mean that the resource is preconfigured for the network device through OAM.

For example, the second indication information may be scheduling information, that is, the second indication information is used to indicate the second time domain resource to be used by the terminal to receive or send the second information on the second link. The second indication information may alternatively indicate the second time domain resource, and the second time domain resource is used to receive or send the second information on the second link. The second indication information may alternatively be higher layer signaling, that is, RRC signaling.

It should be noted that the first time domain resource may be a time domain resource or a time-frequency resource, and the second time domain resource may be a time domain resource or a time-frequency resource. This is not limited in this embodiment of this application.

For example, both the first time domain resource and the second time domain resource are time domain resources. In this case, the first time domain resource or the second time domain resource may be a slot or a symbol. The following describes a plurality of cases of the first time domain resource and the second time domain resource.

For example, the first time domain resource is at least one first slot, and the second time domain resource is at least one second slot; the first time domain resource is at least one first symbol, and the second time domain resource is at least one second symbol; the first time domain resource is M symbols in at least one first slot, where M is an integer greater than or equal to 1, and the second time domain resource is N symbols in at least one second slot, where N is an integer greater than or equal to 1; the first time domain resource is at least one first slot, and the second time domain resource is at least one second symbol; or the first time domain resource is at least one first symbol, and the second time domain resource is at least one second slot.

The first time domain resource is at least one first subframe, and the second time domain resource is at least one second subframe; the first time domain resource is at least one first subframe, and the second time domain resource is at least one second slot; the first time domain resource is at least one first subframe, and the second time domain resource is at least one second symbol; the first time domain resource is at least one first slot, and the second time domain resource is at least one second subframe; or the first time domain resource is at least one first symbol, and the second time domain resource is at least one second subframe.

S603: Determine that the first time domain resource overlaps with the second time domain resource, or the first time domain resource overlaps with a third time domain resource, where the third time domain resource is a time domain resource before or after the second time domain resource.

If the third time domain resource may be the time domain resource before the second time domain resource, for example, an end point of the third time domain resource may be a start point of the second time domain resource or earlier than a start point of the second time domain resource, the third time domain resource may include a first receive/transmit transition time, where the first receive/transmit transition time includes a transmit-to-receive transition time or a receive-to-transmit transition time. Optionally, a start point of the third time domain resource may be a start point of the first receive/transmit transition time or earlier than a start point of the first receive/transmit transition time, and the end point of the third time domain resource may be an end point of the first receive/transmit transition time or later than an end point of the first receive/transmit transition time. In conclusion, a time length occupied by the third time domain resource is greater than or equal to a time length occupied by the first receive/transmit transition time, to ensure that transition is completed. If the third time domain resource before the second time domain resource overlaps with the first time domain resource, there is a conflict between performing receive/transmit transition and receiving/transmitting the first information on an overlapping resource. As a result, the first information cannot be normally received/transmitted or receive/transmit transition cannot be normally completed (receiving/transmitting of data on the second time domain resource is affected). In this case, the terminal cancels receiving/transmitting of the second information on the second time domain resource, and receives/transmits the first information on the first time domain resource, to ensure normal sending or receiving of the first information.

If the third time domain resource is the time domain resource after the second time domain resource, for example, a start point of the third time domain resource may be an end point of the second time domain resource, or a start point of the third time domain resource is later than an end point of the second time domain resource, the third time domain resource may include a second receive/transmit transition time, where the second receive/transmit transition time includes a transmit-to-receive transition time or a receive-to-transmit transition time. Optionally, a time length occupied by the third time domain resource is greater than or equal to a time length occupied by the second receive/transmit transition time, to ensure that transition is completed.

The third time domain resource may be one or more symbols, a length less than one symbol, or a predefined value. This is not limited in this embodiment of this application. The third time domain resource may be in a unit of a millisecond (ms) or a microsecond (μs).

It should be noted that, that the first time domain resource overlaps with the second time domain resource may be that the first time domain resource completely or partially overlaps with the second time domain resource, and that the first time domain resource overlaps with a third time domain resource may also be that the first time domain resource completely or partially overlaps with the third time domain resource.

The following uses an example in which the first time domain resource overlaps with the second time domain resource.

For example, when the first time domain resource is at least one first slot, and the second time domain resource is at least one second slot, if at least one slot or at least one symbol on the first time domain resource overlaps with at least one slot or at least one symbol on the second time domain resource, the first time domain resource overlaps with the second time domain resource.

For another example, if the first time domain resource is at least one first symbol, and the second time domain resource is at least one second symbol, when at least one symbol on the first time domain resource overlaps with at least one symbol on the second time domain resource, the first time domain resource overlaps with the second time domain resource.

For another example, if the first time domain resource is M symbols in at least one first slot, and the second time domain resource is N symbols in at least one second slot, when at least one of the M symbols on the first time domain resource overlaps with at least one of the N symbols on the second time domain resource, the first time domain resource overlaps with the second time domain resource.

For another example, if the first time domain resource is at least one first slot, and the second time domain resource is at least one second symbol, when at least one symbol on the first time domain resource overlaps with at least one symbol on the second time domain resource, the first time domain resource overlaps with the second time domain resource.

For another example, if the first time domain resource is at least one first symbol, and the second time domain resource is at least one second slot, when at least one symbol on the first time domain resource overlaps with at least one symbol on the second time domain resource, the first time domain resource overlaps with the second time domain resource.

It should be noted that because there are many cases of the first time domain resource and the second time domain resource, a case in which the first time domain resource overlaps with the second time domain resource is not described. Similarly, because there are also many cases of the third time domain resource, a case in which the first time domain resource overlaps with the third time domain resource is not described.

S604: The terminal receives or sends the first information on the first time domain resource.

In this embodiment, a priority of the first information on the first link is higher than a priority of the second information on the second link. Therefore, when the first time domain resource overlaps with the second time domain resource, or the first time domain resource overlaps with the third time domain resource, the terminal receives or sends, on the first time domain resource, the first information on the first link.

It should be noted that the terminal may send the first information to the network device or receive the first information from the network device, may send the first information to another terminal, or may receive the first information from another terminal. Therefore, S604 includes a plurality of cases. For example, details are as follows: Case 1: Refer to S604a in FIG. 6. The terminal sends the first information to the network device or receives the first information from the network device. Case 2: Refer to S604b in FIG. 6. The terminal sends the first information to the another terminal, or the terminal receives the first information from the another terminal. Case 1 is used as an example in FIG. 6. Therefore, S604b is represented by a dashed line.

S605: The terminal cancels receiving or sending of the second information on the second time domain resource.

A priority of the first information on the first link is higher than a priority of the second information on the second link. Therefore, when the first time domain resource overlaps with the second time domain resource, or the first time domain resource overlaps with the third time domain resource, the terminal may cancel receiving or sending, on the second time domain resource, of the second information on the second link.

Optionally, an execution sequence between S604 and S605 is not limited in this embodiment of this application. Optionally, in this embodiment of this application, only one of or both S604 and S605 may alternatively be chosen to be performed.

It can be learned from the foregoing content that the communication method provided in this application is applicable to a plurality of application scenarios. A V2X scenario is used as an example. The first link is a cellular link, and the second link is a sidelink; or the first link is a sidelink, and the second link is a cellular link. An IAB scenario is used as an example. The first link is an access link, and the second link is a backhaul link; or the first link is a backhaul link, and the second link is an access link. For example, the terminal supports a plurality of communications systems. The first link may be a cellular link, a backhaul link, a sidelink, or an access link in a first communications system, and the second link may be a cellular link, a backhaul link, a sidelink, or an access link in a second communications system (specifically, a plurality of cases are included. For example, the first link is the cellular link in the first communications system, and the second link is the cellular link in the second communications system; the first link is the sidelink in the first communications system, and the second link is the sidelink in the second communications system; the first link is the cellular link in the first communications system, and the second link is the sidelink in the second communications system; the first link is the sidelink in the first communications system, and the second link is the cellular link in the second communications system; the first link is the access link in the first communications system, and the second link is the access link in the second communications system; the first link is the backhaul link in the first communications system, and the second link is the backhaul link in the second communications system; the first link is the access link in the first communications system, and the second link is the backhaul link in the second communications system; or the first link is the backhaul link in the first communications system, and the second link is the access link in the second communications system). The first communications system may be an LTE system, and the second communications system may be a 5G system; the first communications system is a 5G system, and the second communications system is an LTE system; the first communications system may be an LTE system, and the second communications system may be an LTE system; or the first communications system may be a 5G system, and the second communications system may be a 5G system. It should be noted that the foregoing descriptions are applicable to any embodiment of this application.

In this application, when the first link is the access link, and the second link is the backhaul link; or the first link is the backhaul link, and the second link is the access link, the first information/the second information does not need to be limited to any one of control information, data information, and feedback information transmitted on a sidelink. Similarly, when the first link is the access link in the first communications system, and the second link is the access link in the second communications system; the first link is the backhaul link in the first communications system, and the second link is the backhaul link in the second communications system; the first link is the access link in the first communications system, and the second link is the backhaul link in the second communications system; or the first link is the backhaul link in the first communications system, and the second link is the access link in the second communications system, the first information/the second information does not need to be limited to any one of control information (PSCCH), data information (PSSCH), and feedback information (PSFCH) transmitted on a sidelink. For example, the first information/the second information includes at least one of the following information: a physical downlink shared channel (physical DL shared channel, PDSCH), a physical uplink shared channel (physical UL shared channel, PUSCH), a physical downlink control channel (physical DL control channel, PDCCH), a physical uplink control channel (physical UL control channel, PUCCH), a sounding reference signal (sounding reference signal, SRS), a sidelink channel state information reference signal (sidelink channel state information reference signal, SL-CSI-RS), a physical hybrid ARQ indicator channel (physical hybrid ARQ indicator channel, PHICH), and synchronization information. Similarities are not described. To be specific, the first information/the second information may be corresponding information obtained by removing such a specific limitation SL. For example, a channel obtained by removing such a specific limitation SL from a PSCCH may be correspondingly a PUCCH/PDCCH.

In this application, that preset time domain resources completely or partially overlap may be overlapping on one or more symbols or on a time length less than one symbol (that is, an overlapping resource may be the one or more symbols, or may be the time length less than the one symbol). In addition, in this application, that the first time domain resource completely or partially overlaps with the second time domain resource may be overlapping on one or more symbols or on a time length less than one symbol. In this application, that the first time domain resource completely or partially overlaps with the third time domain resource may be overlapping on one or more symbols or on a time length less than one symbol. In conclusion, in this application, that any two time domain resources overlap may be overlapping on one or more symbols or on a time length less than one symbol.

Descriptions are provided below by using a V2X scenario as an example in two cases.

Case 1: The first link is a cellular link, and the second link is a sidelink.

Example 1

The terminal obtains the first indication information, where the first indication information is used to indicate the first time domain resource to be used by the terminal to send the first information on the first link (the cellular link), and the first information includes at least one of the following information: a physical random access channel (physical random access channel, PRACH), ultra-reliable and low-latency communication (ultra-reliable and low-latency communication, URLLC) data, grant-free (grant-free) data, and high quality of service (quality of service, QoS) data.

The grant-free data usually refers to data transmission indicated by grant-free scheduling, and includes a data transmission resource configured by the network device by using semi-static signaling, and/or a data transmission resource that is configured by the network device by using semi-static signaling and that needs to be activated by using dynamic signaling. The high QoS data includes data that has a relatively high PPPP, data that has a relatively high 5QI, or the like that is determined based on a ProSe per-packet priority (ProSe Per-Packet Priority, PPPP), a 5G QoS index (5G QoS index, 5QI), or any QoS criterion.

The terminal obtains the second indication information, where the second indication information is used to indicate the second time domain resource to be used by the terminal to receive or send the second information on the second link (the sidelink). The second information includes at least one of the following information: a physical sidelink shared channel (physical sidelink shared channel, PSSCH), a physical sidelink control channel (physical sidelink control channel, PSCCH), a sidelink sounding reference signal (sidelink sounding reference signal, SL-SRS), a sidelink channel state information reference signal (sidelink channel state information reference signal, SL-CSI-RS), a physical sidelink feedback channel (physical sidelink feedback channel, PSFCH), and a sidelink synchronization information block (SL-SS block).

In Example 1, if there is a resource conflict in data receiving/transmitting on the cellular link and the sidelink, the resource conflict may be resolved in a plurality of manners. Two manners are listed below.

Manner 1: If the first time domain resource overlaps with the second time domain resource, the terminal sends, on the first time domain resource, the first information on the first link (the cellular link), and/or the terminal cancels receiving or sending, on the second time domain resource, of the second information on the second link (the sidelink).

Figure 7:
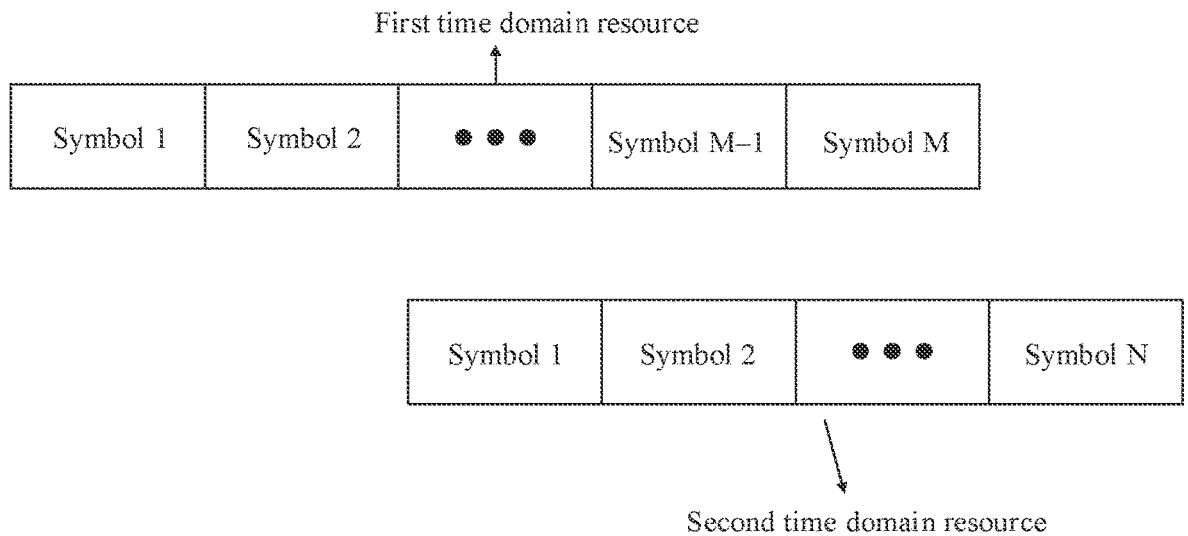
FIG. 7 is a schematic diagram of a first time domain resource and a second time domain resource according to an embodiment of the present invention.

For example, refer to FIG. 7. An example in which the first time domain resource is M symbols in one slot is used. The terminal obtains first indication information, where the first indication information is used to indicate the first time domain resource to be used by the terminal to send a PRACH. The terminal obtains second indication information, where the second indication information is used to indicate a second time domain resource (N symbols in one slot) to be used by the terminal to receive/transmit SL data. If the first time domain resource overlaps with the second time domain resource, the terminal may cancel receiving/transmitting of the SL data on the second time domain resource, and send the PRACH on the first time domain resource.

To be specific, when the first time domain resource used to send the PRACH (completely or partially) overlaps with the second time domain resource used to receive/transmit the SL data, a priority of the PRACH is higher than a priority of the SL data, and therefore the terminal first considers the PRACH with a higher priority, and cancels receiving/transmitting of the SL data with a lower priority.

It should be noted that in the foregoing example, the first indication information may be a random access channel configuration index (RACH-ConfigurationIndex) or information included in RACH-ConfigurationIndex. This is not limited in this embodiment of this application. RACH-ConfigurationIndex may be included in a physical random channel configuration common message (RACH-Config-Common).

The second indication information may be an SL slot format configuration. The SL slot format configuration includes a semi-static cell-specific and/or UE-specific slot format configuration.

For another example, the first time domain resource is M symbols in one slot. The terminal obtains first indication information, where the first indication information is used to indicate the first time domain resource to be used by the terminal to send a URLLC data. The terminal obtains second indication information, where the second indication information is used to indicate a second time domain resource to be used by the terminal to receive/transmit SL data. If the first time domain resource overlaps with the second time domain resource, the terminal cancels receiving/transmitting of the SL data on the second time domain resource, and sends the URLLC data on the first time domain resource. The second indication information may be an SL slot format configuration, downlink control information (downlink control information, DCI) on a Uu interface, sidelink control information (sidelink control information, SCI), an SFI-SL, or the like. Alternatively, the second indication information is information carried in DCI, SCI, or an SFI-SL. The SL slot format configuration may be sent by the network device.

Optionally, in the foregoing example, the URLLC data may be data including PUSCH repetition, for example, PUSCH repetition activated by a PDCCH. The PDCCH includes UL grant information, for example, a type 2 UL grant.

In conclusion, for one or more symbols used to indicate to perform any PUSCH repetition, the terminal does not expect to receive the second indication information indicating that any one of the one or more symbols is used to receive/transmit the SL data. The PUSCH repetition is activated by the PDCCH, and the PDCCH includes the UL grant information, for example, the type 2 UL grant.

It should be noted that "receiving/transmitting" in this embodiment of this application includes either of receiving and sending.

In Manner 1, the first time domain resource is indicated to be used to send the first information on the cellular link, and the second time domain resource is indicated to be used to receive/transmit the second information on the sidelink. If the first time domain resource overlaps with the second time domain resource, a priority of the first information is higher than a priority of the second information.

Manner 2: If the first time domain resource overlaps with the third time domain resource (a preset time domain resource before or after the second time domain resource), the terminal sends, on the first time domain resource, the first information on the first link (the cellular link), and/or the terminal cancels receiving or sending, on the second time domain resource, of the second information on the second link (the sidelink).

Figure 8:
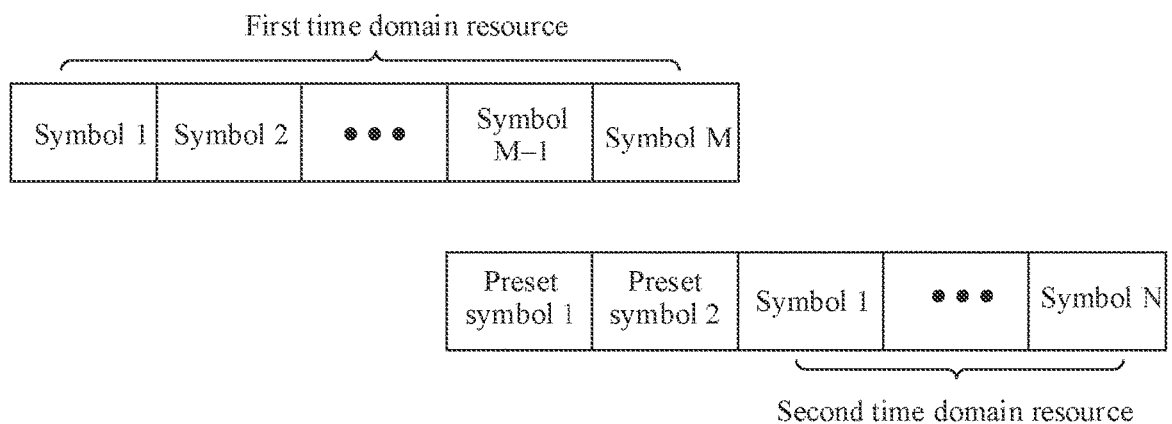
FIG. 8 is a schematic diagram of a first time domain resource and a second time domain resource according to an embodiment of the present invention.

For example, refer to FIG. 8. An example in which the first time domain resource is M symbols in one slot is used. The first time domain resource is indicated to be used by the terminal to send a PRACH. The terminal obtains second indication information, where the second indication information is used to indicate to receive or send SL data on a second time domain resource (N symbols in one slot). If a preset time domain resource before the second time domain resource (two preset symbols before the second time domain resource are used as an example in FIG. 8) overlaps with the first time domain resource, a priority of the PRACH is higher than a priority of the SL data, and therefore the terminal first considers the PRACH with a higher priority, and cancels receiving/transmitting of the SL data with a lower priority. A preset time domain resource before or after the second time domain resource may be P symbols, where P is a positive integer. For example, as shown in FIG. 8, P is 2. The two preset symbols before the second time domain resource are used as an example.

Optionally, the preset time domain resource before the second time domain resource may alternatively be replaced with a preset time domain resource before or after the first time domain resource. In other words, the third time domain resource may be replaced with the preset time domain resource before or after the first time domain resource. An example in which the first time domain resource is M symbols in one slot is still used. The first time domain resource is indicated to be used by the terminal to send a PRACH. The terminal obtains second indication information, where the second indication information is used to indicate to receive or send SL data on a second time domain resource (N symbols in one slot). If a preset time domain resource before the first time domain resource overlaps with the second time domain resource, a priority of the PRACH is higher than a priority of the SL data, and therefore the terminal first considers the PRACH with a higher priority, and cancels receiving/transmitting of the SL data with a lower priority.

It should be understood that the preset time domain resource before or after the second time domain resource or the preset time domain resource before or after the first time domain resource may be P symbols, where P is a positive integer. The preset time domain resource before or after the second time domain resource or the preset time domain resource before or after the first time domain resource may alternatively be a GAP.

The second indication information may be a UE-specific semi-static SL slot format configuration (TDD-UL-DL-ConfigDedicated-SL or TDD-UL-DL-SL-ConfigDedicated), or may be a cell-specific semi-static SL slot format configuration (TDD-UL-DL-ConfigCell-SL or TDD-UL-DL-SL-ConfigCell), DCI on a Uu interface, SCI, or an SFI-SL. This is not limited in this embodiment of this application.

Example 2

The terminal obtains the first indication information, where the first indication information is used to indicate the first time domain resource to be used by the terminal to receive the first information on the first link (the cellular link), and the first information includes at least one of the following information: a synchronization signal block (synchronization signal block, SS block), a physical broadcast channel block (PBCH block), synchronization information (synchronization signal, SS), and a control resource set (control resource set, CORESET).

The synchronization information or the CORESET is, for example, information used in a Type0-PDCCH common search space (CSS) set.

The terminal obtains the second indication information, where the second indication information is used to indicate the second time domain resource to be used by the terminal to receive or send the second information on the second link (the sidelink). The second information includes at least one of the following information: a physical sidelink shared channel (physical sidelink shared channel, PSSCH), a physical sidelink control channel (physical sidelink control channel, PSCCH), a sidelink sounding reference signal (sidelink sounding reference signal, SL-SRS), a sidelink channel state information reference signal (sidelink channel state information reference signal, SL-CSI-RS), a physical sidelink feedback channel (physical sidelink feedback channel, PSFCH), and SL synchronization information.

In this case, a resource conflict may be resolved in a plurality of manners. Two manners are listed below.

Manner 1: If the first time domain resource overlaps with the second time domain resource, the terminal receives, on the first time domain resource, the first information on the first link (the cellular link), and/or the terminal cancels receiving or sending, on the second time domain resource, of the second information on the second link (the sidelink).

For example, the terminal receives the first indication information sent by the network device, where the first indication information is used to indicate the first time domain resource to be used by the terminal to receive the SS/PBCH block. The terminal obtains the second indication information, where the second indication information is used to indicate the second time domain resource to be used by the terminal to receive/transmit the SL data. If the first time domain resource overlaps with the second time domain resource, a priority of the SS/PBCH block is higher than a priority of the SL data, and therefore the terminal may cancel receiving/transmitting of the SL data on the second time domain resource, and receive the SS/PBCH block on the first time domain resource.

The first indication information may be indicated by the network device to the terminal by using ssb-PositionsInBurst in SystemInformationBlockType1 or by using ssb-PositionsInBurst in ServingCellConfigCommon. This is not limited in this embodiment of this application.

For another example, the terminal obtains the first indication information, where the first indication information is used to indicate the first time domain resource to be used by the terminal to receive the synchronization information/CORESET. The terminal obtains the second indication information, where the second indication information is used to indicate the second time domain resource to be used by the terminal to receive or send the SL data. In this case, a priority of the synchronization information/CORESET is higher than a priority of the SL data, and therefore the terminal may cancel receiving/transmitting of the SL data on the second time domain resource, and receive the synchronization information/CORESET on the first time domain resource.

The second indication information may be a UE-specific semi-static SL slot format configuration (TDD-UL-DL-ConfigDedicated-SL or TDD-UL-DL-SL-ConfigDedicated), or may be a cell-specific semi-static SL slot format configuration (TDD-UL-DL-ConfigCell-SL or TDD-UL-DL-SL- ConfigCell), DCI on a Uu interface, SCI, or an SFI-SL. This is not limited in this embodiment of this application.

Manner 2: If the first time domain resource overlaps with a preset time domain resource before the second time domain resource, the terminal receives, on the first time domain resource, the first information on the first link (the cellular link), and/or the terminal cancels receiving or sending, on the second time domain resource, of the second information on the second link (the sidelink).

An example in which the first time domain resource is M symbols in one slot is used. The first time domain resource is indicated to be used by the terminal to receive an SS block or a PBCH block. The terminal obtains second indication information, where the second indication information is used to indicate to receive or send SL data on a second time domain resource. If the preset time domain resource before the second time domain resource overlaps with the first time domain resource, a priority of the SS block or the PBCH block is higher than a priority of the SL data, and therefore the terminal first considers the SS block or the PBCH block with a higher priority, and cancels receiving/transmitting of the SL data with a lower priority. The preset time domain resource may be P symbols, where P is a positive integer.

Optionally, the preset time domain resource before the second time domain resource may alternatively be replaced with a preset time domain resource before the first time domain resource. For example, if the preset time domain resource before the first time domain resource overlaps with the second time domain resource, a priority of the SS block or the PBCH block is higher than a priority of the SL data, and therefore the terminal first considers the SS block or the PBCH block with a higher priority, and cancels receiving/transmitting of the SL data with a lower priority. The preset time domain resource before the first time domain resource may be P symbols, where P is a positive integer.

The second indication information may be a UE-specific semi-static SL slot format configuration (TDD-UL-DL-ConfigDedicated-SL or TDD-UL-DL-SL-ConfigDedicated), or may be a cell-specific semi-static SL slot format configuration (TDD-UL-DL-ConfigCell-SL or TDD-UL-DL-SL-ConfigCell), DCI on a Uu interface, SCI, or an SFI-SL. This is not limited in this embodiment of this application.

In this application, the UE-specific semi-static SL slot format configuration is a semi-static SL slot format configuration specific to specific UE, and the cell-specific semi-static SL slot format configuration is a semi-static SL slot format configuration specific to a cell or a cell common (cell common) semi-static SL slot format configuration.

Case 2: The first link is a sidelink, and the second link is a cellular link.

Example 1

The terminal obtains the first indication information, where the first indication information is used to indicate the first time domain resource to be used by the terminal to send or receive the first information on the first link (the sidelink), and the first information includes at least one of the following information: a PSSCH, a PSCCH, an SL-SRS, an SL-CSI-RS, and a PSFCH.

The terminal obtains the second indication information, where the second indication information is used to indicate the second time domain resource to be used by the terminal to send the second information on the second link, and the second information includes at least one of the following information: an SRS, a PUCCH, and a PUSCH. The second information may further include at least one of the following information: a periodic SRS, an aperiodic SRS, a PUCCH carrying only periodic CSI, a PUSCH carrying only periodic CSI, and a periodic RACH. The second indication information is configured by using higher layer signaling. In this application, the higher layer signaling is RRC signaling. To be specific, the second indication information is indicated by the network device to the terminal by using semi-statically configured RRC signaling.

In this case, a resource conflict may be resolved in a plurality of manners. The manners are listed below.

Manner 1: If the first time domain resource overlaps with the second time domain resource, the terminal receives or sends, on the first time domain resource, the first information on the first link (the sidelink), and/or the terminal cancels sending, on the second time domain resource, of the second information on the second link (the cellular link).

For example, the terminal receives first indication information sent by the network device, where the first indication information is used to indicate the first time domain resource to be used by the terminal to receive/transmit SL data. The terminal obtains second indication information, where the second indication information is used to indicate the second time domain resource to be used by the terminal to send an SRS/PUCCH/PUSCH. In this case, a priority of the SL data is higher than a priority of the SRS/PUCCH/PUSCH, and therefore the terminal may cancel sending of the SRS/PUCCH/PUSCH on the second time domain resource, and receive/transmit the SL data on the first time domain resource.

The second indication information may be a semi-static SL slot format configuration, DCI on a Uu interface, SCI, an SFI-SL, or the like. Alternatively, the second indication information is information carried in DCI, SCI, or an SFI-SL. The SL slot format configuration may be sent by the network device. To be specific, the terminal may obtain the first indication information by detecting the semi-static SL slot format configuration, the DCI on the Uu interface, or the SFI-SL.

Manner 2: If the first time domain resource overlaps with the third time domain resource (a preset time domain resource before or after the second time domain resource), the terminal sends or receives the first information on the first time domain resource, and/or the terminal cancels sending of the second information on the second time domain resource.

For example, the terminal receives first indication information sent by the network device, where the first indication information is used to indicate the first time domain resource to be used by the terminal to receive/transmit SL data. The terminal obtains second indication information, where the second indication information is used to indicate the second time domain resource to be used by the terminal to send an SRS/PUCCH/PUSCH. If the preset time domain resource before the second time domain resource overlaps with the first time domain resource, a priority of the SL data is higher than a priority of the SRS/PUCCH/PUSCH, and therefore the terminal may cancel sending of the SRS/PUCCH/PUSCH on the second time domain resource, and receive/transmit the SL data on the first time domain resource.

Manner 3: If the second time domain resource overlaps with the third time domain resource (a preset time domain resource before or after the first time domain resource), the terminal sends or receives the first information on the first time domain resource, and/or the terminal cancels sending of the second information on the second time domain resource.

For example, the terminal receives first indication information sent by the network device, where the first indication information is used to indicate the first time domain resource to be used by the terminal to receive/transmit SL data. The terminal obtains second indication information, where the second indication information is used to indicate the second time domain resource to be used by the terminal to send an SRS/PUCCH/PUSCH. If the preset time domain resource before the first time domain resource overlaps with the second time domain resource, a priority of the SL data is higher than a priority of the SRS/PUCCH/PUSCH, and therefore the terminal may cancel sending of the SRS/PUCCH/PUSCH on the second time domain resource, and receive/transmit the SL data on the first time domain resource.

Example 2

The terminal obtains the first indication information, where the first indication information is used to indicate the first time domain resource to be used by the terminal to send or receive the first information on the first link (the sidelink), and the first information includes at least one of the following information: a PSSCH, a PSCCH, an SL-SRS, an SL-CSI-RS, and a PSFCH.

The terminal obtains the second indication information, where the second indication information is used to indicate the second time domain resource to be used by the terminal to receive the second information on the second link, and the second information includes at least one of the following information: a CSI-RS, a DMRS, an SS, and an SSB.

In this case, a resource conflict may be resolved in a plurality of manners. The manners are listed below.

Manner 1: If the first time domain resource overlaps with the second time domain resource, the terminal receives or sends, on the first time domain resource, the first information on the first link (the sidelink), and/or the terminal cancels receiving, on the second time domain resource, of the second information on the second link (the cellular link).

For example, the terminal obtains first indication information, where the first indication information is used to indicate the first time domain resource to be used by the terminal to receive/transmit SL data. The terminal obtains second indication information, where the second indication information is used to indicate the second time domain resource to be used by the terminal to receive a CSI-RS or a PDSCH. If the first time domain resource overlaps with the second time domain resource, a priority of the SL data is higher than a priority of the CSI-RS or the PDSCH, and therefore the terminal may cancel receiving of the CSI-RS or the PDSCH on the second time domain resource, and receive/transmit the SL data on the first time domain resource.

The first indication information may be a semi-static SL slot format configuration, DCI on a Uu interface, SCI, an SFI-SL, or the like. Alternatively, the second indication information is information carried in DCI, SCI, or an SFI-SL. The semi-static SL slot format configuration may be sent by the network device. To be specific, the terminal may obtain the first indication information by detecting the semi-static SL slot format configuration, the DCI on the Uu interface, or the SFI-SL.

Manner 2: If the first time domain resource overlaps with the third time domain resource (a preset time domain resource before or after the second time domain resource), the terminal sends or receives the first information on the first time domain resource, and/or the terminal cancels receiving of the second information on the second time domain resource.

For example, the terminal obtains first indication information, where the first indication information is used to indicate the first time domain resource to be used by the terminal to receive/transmit SL data. The terminal obtains second indication information, where the second indication information is used to indicate the second time domain resource to be used by the terminal to receive a CSI-RS or a PDSCH. If the first time domain resource overlaps with the preset time domain resource before the second time domain resource, a priority of the SL data is higher than a priority of the CSI-RS or the PDSCH, and therefore the terminal may cancel receiving of the CSI-RS or the PDSCH on the second time domain resource, and receive/transmit the SL data on the first time domain resource.

Manner 3: If the second time domain resource overlaps with the third time domain resource (a preset time domain resource before or after the first time domain resource), the terminal sends or receives the first information on the first time domain resource, and/or the terminal cancels receiving of the second information on the second time domain resource.

For example, the terminal obtains first indication information, where the first indication information is used to indicate the first time domain resource to be used by the terminal to receive/transmit SL data. The terminal obtains second indication information, where the second indication information is used to indicate the second time domain resource to be used by the terminal to receive a CSI-RS or a PDSCH. If the second time domain resource overlaps with the preset time domain resource before the first time domain resource, a priority of the SL data is higher than a priority of the CSI-RS or the PDSCH, and therefore the terminal may cancel receiving of the CSI-RS or the PDSCH on the second time domain resource, and receive/transmit the SL data on the first time domain resource.

Embodiment 2

Figure 9:
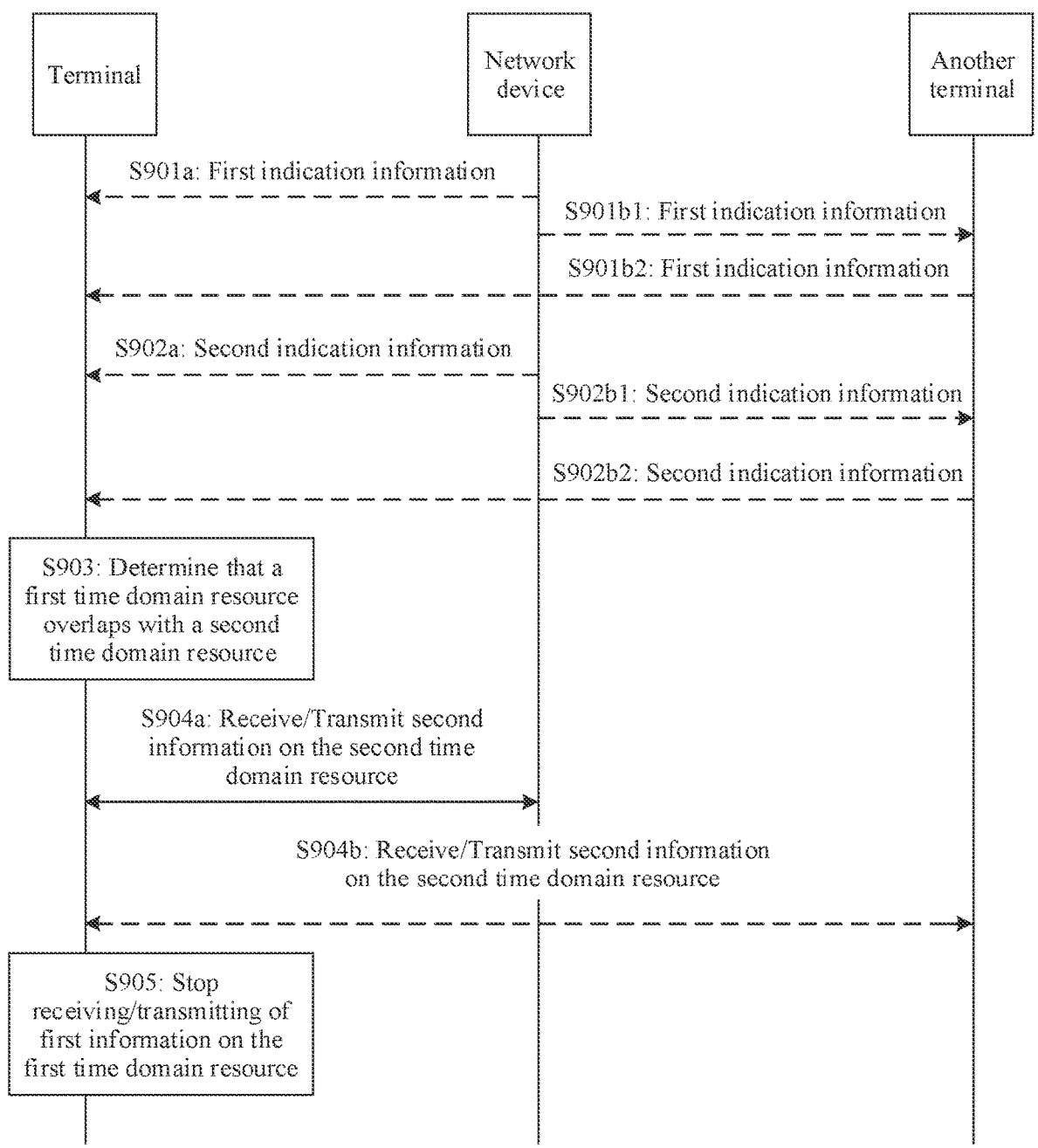
FIG. 9 is a schematic diagram of a procedure of a communication method according to an embodiment of the present invention.

FIG. 9 is a diagram of a procedure of a communication method according to an embodiment of this application. As shown in FIG. 9, the procedure includes the following steps.

S901: A terminal obtains first indication information, where the first indication information is used to indicate a first time domain resource to be used by the terminal to send or receive first information on a first link.

S902: The terminal obtains second indication information, where the second indication information is used to indicate a second time domain resource to be used by the terminal to send or receive second information on a second link.

It should be noted that for descriptions of the first indication information, the second indication information, the first information, the second information, the first time domain resource, and the second time domain resource, refer to the embodiment shown in FIG. 6. Details are not described herein again.

S903: Determine that the first time domain resource overlaps with the second time domain resource.

Optionally, after performing S903, the terminal may determine first duration, and perform S904 and/or S905 after or within the first duration.

Optionally, the first duration may be first preparation duration of the first information, may be second preparation duration of the second information, or may be a minimum value of the first preparation duration and the second preparation duration. The first preparation duration may be the same as or different from the second preparation duration.

It should be noted that in this embodiment of this application, a preparation time (or preparation duration) may alternatively be replaced with a processing time (or processing duration), and is duration determined based on a processing capability.

For example, the first duration is the preparation duration of the first information. The preparation duration is calculated from a last moment at which the first indication information is received. To be specific, a start point of the first duration is the last moment (the moment may also be referred to as a time point) at which the first indication information is received, and an end point of the first duration is a start point of the first time domain resource or earlier than a start point of the first time domain resource. Within the first duration, the terminal prepares for receiving or sending the first information. The first duration may be one or more symbols, or may be a value less than one symbol, specifically depending on the processing capability of the terminal.

S904: Receive or send the second information on the second time domain resource.

It should be understood that in the embodiment shown in FIG. 9, when the second information is different information, a device that sends the second information to the terminal or a device (a peer side of the terminal) that receives the second information may be a network device or another terminal device. Therefore, S904b is represented by a dashed line.

S905: Stop receiving or sending of the first information on the first time domain resource.

It should be noted that when the first time domain resource overlaps with the second time domain resource, the terminal may wait for the first duration. To be specific, the terminal may send or receive, after the first duration, the second information on the second time domain resource, and/or stop, after the first duration, receiving or sending of the first information on the first time domain resource. Certainly, the terminal may alternatively not need to wait for the first duration. To be specific, the terminal may send or receive, within the first duration, the second information on the second time domain resource, and/or stop, within the first duration, receiving or sending of the first information on the first time domain resource.

In this embodiment, a priority of the second information on the second link is higher than a priority of the first information on the first link. Therefore, when the first time domain resource overlaps with the second time domain resource, the terminal receives or sends, on the second time domain resource, the second information on the second link, and cancels receiving or sending, on the first time domain resource, of the first information on the first link.

Optionally, that the terminal stops (or cancels), after the first duration, receiving or sending of the first information on the first time domain resource may include: The terminal stops (or cancels), after the first duration, receiving or sending of the first information on an overlapping resource between the first time domain resource and the second time domain resource.

Optionally, that the terminal cancels, within the first preparation duration, receiving or sending of the first information on the first time domain resource may include: The terminal cancels, within the first preparation duration, receiving or sending of the first information on an overlapping resource between the first time domain resource and the second time domain resource.

Similarly, the communication method provided in this embodiment is applicable to a plurality of application scenarios. A V2X scenario is used as an example. The first link is a cellular link, and the second link is a sidelink; or the first link is a sidelink, and the second link is a cellular link. An IAB scenario is used as an example. The first link is an access link, and the second link is a backhaul link; or the first link is a backhaul link, and the second link is an access link. For example, the terminal supports a plurality of communications systems. The first link may be a cellular link, a backhaul link, a sidelink, or an access link in a first communications system, and the second link may be a cellular link, a backhaul link, a sidelink, or an access link in a second communications system (specifically, a plurality of cases are included. For example, the first link is the cellular link in the first communications system, and the second link is the cellular link in the second communications system; the first link is the sidelink in the first communications system, and the second link is the sidelink in the second communications system; the first link is the cellular link in the first communications system, and the second link is the sidelink in the second communications system; the first link is the sidelink in the first communications system, and the second link is the cellular link in the second communications system; the first link is the access link in the first communications system, and the second link is the access link in the second communications system; the first link is the backhaul link in the first communications system, and the second link is the backhaul link in the second communications system; the first link is the access link in the first communications system, and the second link is the backhaul link in the second communications system; or the first link is the backhaul link in the first communications system, and the second link is the access link in the second communications system). The first communications system may be an LTE system, and the second communications system may be a 5G system; the first communications system is a 5G system, and the second communications system is an LTE system; the first communications system may be an LTE system, and the second communications system may be an LTE system; or the first communications system may be a 5G system, and the second communications system may be a 5G system.

In this application, when the first link is the access link, and the second link is the backhaul link; or the first link is the backhaul link, and the second link is the access link, the first information/the second information does not need to be limited to any one of control information, data information, and feedback information transmitted on a sidelink. Similarly, when the first link is the access link in the first communications system, and the second link is the access link in the second communications system; the first link is the backhaul link in the first communications system, and the second link is the backhaul link in the second communications system; the first link is the access link in the first communications system, and the second link is the backhaul link in the second communications system; or the first link is the backhaul link in the first communications system, and the second link is the access link in the second communications system, the first information/the second information does not need to be limited to any one of control information (PSCCH), data information (PSSCH), and feedback information (PSFCH) transmitted on a sidelink. For example, the first information/the second information includes at least one of the following information: a physical downlink shared channel (physical DL shared channel, PDSCH), a physical uplink shared channel (physical UL shared channel, PUSCH), a physical downlink control channel (physical DL control channel, PDCCH), a physical uplink control channel (physical UL control channel, PUCCH), a sounding reference signal (sounding reference signal, SRS), a sidelink channel state information reference signal (sidelink channel state information reference signal, SL-CSI-RS), a physical hybrid ARQ indicator channel (physical hybrid ARQ indicator channel, PHICH), and synchronization information. Similarities are not described. To be specific, the first information/the second information may be corresponding information obtained by removing such a specific limitation SL. For example, a channel obtained by removing such a specific limitation SL from a PSCCH may be correspondingly a PUCCH/PDCCH.

Descriptions are provided below by using a V2X scenario as an example and by using an example in which the first link is a cellular link, and the second link is a sidelink.

Example 1

The terminal obtains the first indication information, where the first indication information is used to indicate the first time domain resource to be used by the terminal to receive the first information on the first link (the cellular link), and the first information includes at least one of the following information: a PDSCH, a CSI-RS, and a DMRS.

Optionally, the first information may be configured by using higher layer signaling.

The terminal obtains the second indication information, where the second indication information is used to indicate the second time domain resource to be used by the terminal to receive the second information on the second link (the sidelink), and the second information includes at least one of the following information: a CSI-RS, an SRS, a PUCCH, a PUSCH, a PRACH, and a DMRS.

In Example 1, a resource conflict is handled in two manners.

Manner 1: If the first time domain resource overlaps with the second time domain resource, the terminal sends or receives, after the first duration, the second information on the second time domain resource, and/or the terminal cancels, after the first duration, receiving of the first information on the first time domain resource.

Figure 10:
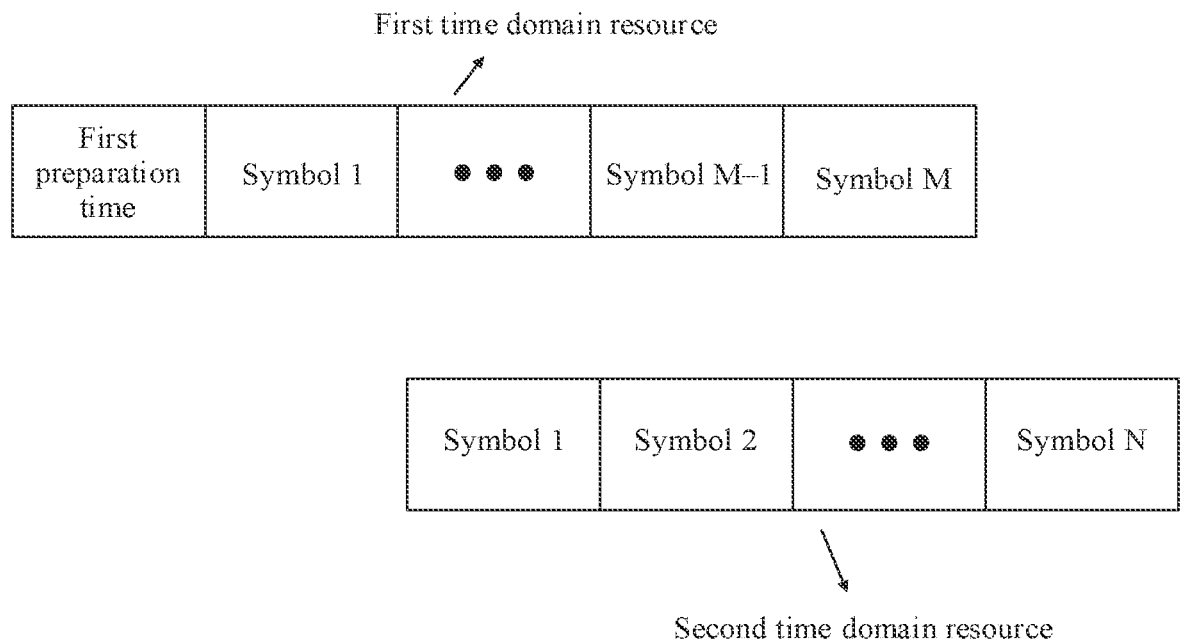
FIG. 10 is a schematic diagram of a first time domain resource and a second time domain resource according to an embodiment of the present invention.

For example, refer to FIG. 10. The terminal obtains first indication information, where the first indication information is used to indicate a first time domain resource (M symbols in one slot) to be used by the terminal to receive a CSI-RS. The terminal obtains second indication information, where the second indication information is used to indicate a second time domain resource (N symbols in one slot) to be used by the terminal to receive/transmit SL data. If the first time domain resource overlaps with the second time domain resource, that is, at least one of the M symbols overlaps with at least one of the N symbols, the terminal may cancel, after the preparation duration (the first preparation duration) of the CSI-RS, receiving of the CSI-RS on the symbol, and receive/transmit, after the preparation duration of the CSI-RS, the SL data on the second time domain resource.

Manner 2: If the first time domain resource overlaps with the second time domain resource, the terminal sends or receives, within the first duration, the second information on the second time domain resource, and/or the terminal cancels, within the first duration, receiving of the first information on the first time domain resource.

Figure 11:
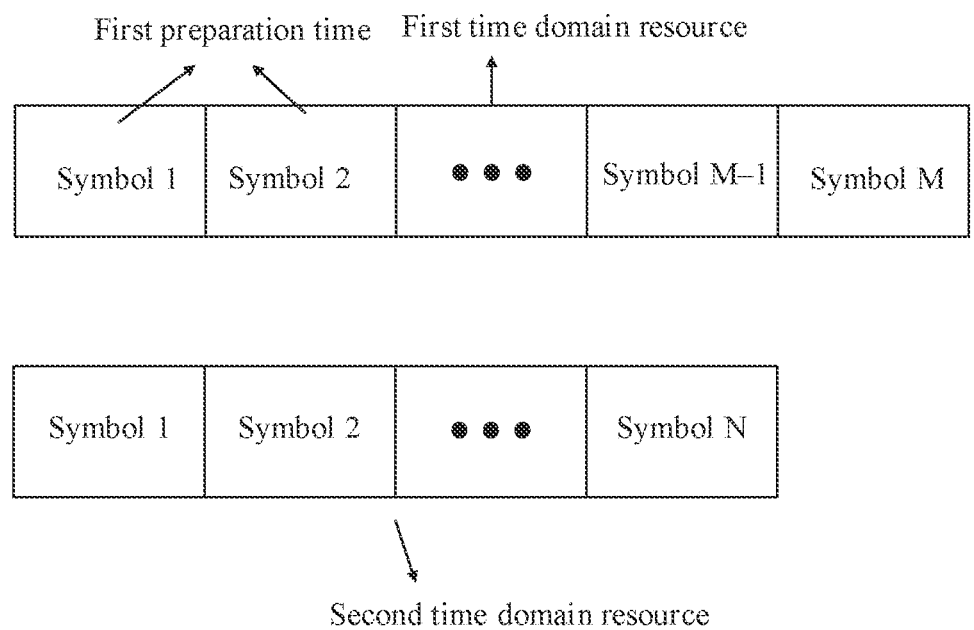
FIG. 11 is a schematic diagram of a first time domain resource and a second time domain resource according to an embodiment of the present invention.

For example, refer to FIG. 11. The terminal obtains first indication information, where the first indication information is used to indicate a first time domain resource to be used by the terminal to receive a CSI-RS. The terminal obtains second indication information, where the second indication information is used to indicate a second time domain resource to be used by the terminal to receive/transmit SL data. If the first time domain resource overlaps with the second time domain resource, the terminal may cancel, within the preparation duration of the CSI-RS, receiving of the CSI-RS on the first time domain resource, and receive/transmit, within the preparation duration of the CSI-RS, the SL data on the second time domain resource.

It should be noted that in the example shown in FIG. 10, for example, the first preparation duration occupies one symbol, and in the example shown in FIG. 11, for example, the first preparation duration occupies two symbols. In actual application, the first preparation duration may occupy one or more symbols. This is not limited in this embodiment of this application.

Example 2

The terminal obtains the first indication information, where the first indication information is used to indicate the first time domain resource to be used by the terminal to send the first information on the first link (the cellular link), and the first information includes at least one of the following information: an SRS, a PUCCH, a PUSCH, and a PRACH.

Optionally, the first information may alternatively be configured by using higher layer signaling.

The terminal obtains the second indication information, where the second indication information is used to indicate the second time domain resource to be used by the terminal to send or receive the second information on the second link (the sidelink), and the second information includes at least one of the following information: a PSSCH, a PSCCH, an SL-SRS, an SL-CSI-RS, and a PSFCH.

In Example 2, a resource conflict is handled in two manners.

Manner 1: If the first time domain resource overlaps with the second time domain resource, the terminal receives, after the first duration, the second information on the second time domain resource, and/or the terminal cancels, after the first duration, sending of the first information on the first time domain resource.

For example, the terminal obtains first indication information, where the first indication information is used to indicate a first time domain resource (M symbols in one slot) to be used by the terminal to send a PUCCH. The terminal obtains second indication information, where the second indication information is used to indicate a second time domain resource (N symbols in one slot) to be used by the terminal to receive/transmit SL data. If the first time domain resource overlaps with the second time domain resource, the terminal may cancel, after the preparation duration (the first preparation duration) of the PUCCH, sending of the CSI-RS on the symbol, and receive/transmit, after the preparation duration of the PUCCH, the SL data on the second time domain resource.

Manner 2: If the first time domain resource overlaps with the second time domain resource, the terminal sends or receives, within the first duration, the second information on the second time domain resource, and/or the terminal cancels, within the first duration, sending of the first information on the first time domain resource.

For example, the terminal obtains first indication information, where the first indication information is used to indicate the first time domain resource to be used by the terminal to send a PRACH. The terminal obtains second indication information, where the second indication information is used to indicate a second time domain resource to be used by the terminal to receive/transmit SL data. If the first time domain resource overlaps with the second time domain resource, the terminal may cancel, within the preparation duration of the PRACH, sending of the PRACH on the first time domain resource, and receive/transmit, within the preparation duration of the PRACH, the SL data on the second time domain resource.

Optionally, that the terminal cancels, after the first preparation duration, receiving or sending of the first information on the first time domain resource may include: The terminal cancels, after the first preparation duration, receiving or sending of the first information on an overlapping resource between the first time domain resource and the second time domain resource. FIG. 10 is used as an example. The terminal cancels, after the first preparation duration, receiving or sending of the first information on a symbol M/M–1/M–2.

Optionally, that the terminal cancels, within the first preparation duration, receiving or sending of the first information on the first time domain resource may include: The terminal cancels, within the first preparation duration, receiving or sending of the first information on an overlapping resource between the first time domain resource and the second time domain resource. FIG. 11 is used as an example. The terminal cancels, within the first preparation duration, receiving or sending of the first information on a symbol 1 and a symbol 2.

It should be noted that in this application, any overlapping resource may be one or more symbols, or may be a time length less than one symbol.

An example in which the first link is a sidelink, and the second link is a cellular link is used.

The first indication information may be used to indicate the terminal to receive or send, on the first time domain resource, the first information on the first link, and the first information includes one or more of a PSSCH, a PSCCH, an SL-SRS, an SL-CSI-RS, and a PSFCH.

The second indication information may be used to indicate the terminal to send, on the second time domain resource, the second information on the second link, and the second information may include a PRACH, URLLC data, grant-free (grant-free) data, and high quality of service data.

Alternatively, the second indication information may be used to indicate the terminal to receive, on the second time domain resource, the second information on the second link, and the second information may include at least one of the following information: an SS block, a PBCH block, an SS, and a CORESET.

Embodiment 3

Figure 12:
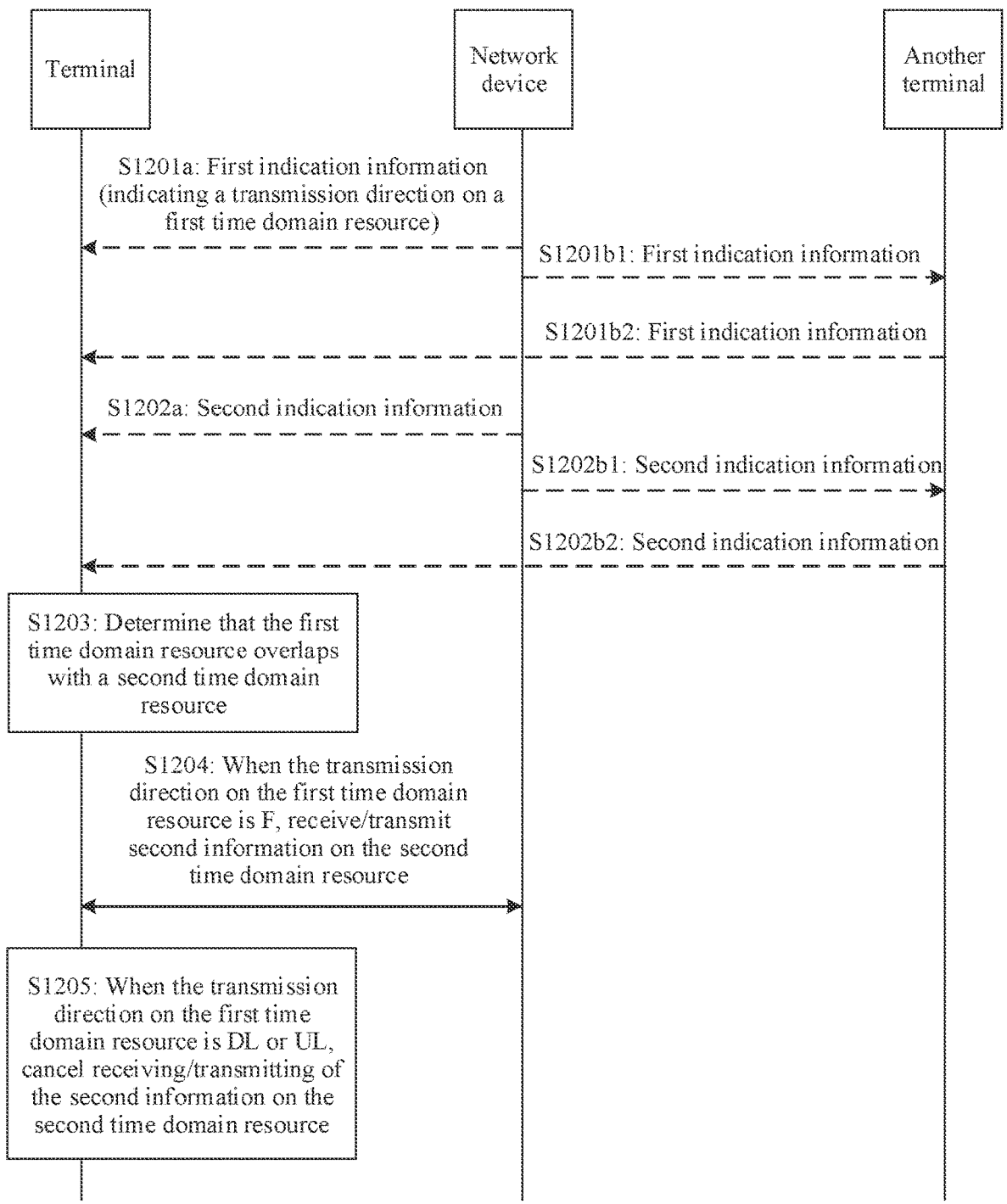
FIG. 12 is a schematic diagram of a procedure of a communication method according to an embodiment of the present invention.

FIG. 12 is a schematic diagram of a procedure of a communication method according to an embodiment of this application. As shown in FIG. 12, the procedure includes the following steps.

S1201: A terminal obtains first indication information, where the first indication information is used to indicate a data transmission direction on a first time domain resource.

The transmission method of the time domain resource includes uplink (UL), downlink (DL), or flexible (F).

It can be learned from the foregoing content that one time domain resource may be one or more slots, and different symbols in one slot are downlink, uplink, or flexible.

For example, step S1201 in FIG. 12 is implemented in a plurality of manners, for example, step S1201a, that is, a network device sends the first indication information to the terminal, or step S1201b1 and step S1201b2, that is, a network device sends the first indication information to the terminal by using another terminal.

S1202: The terminal obtains second indication information, where the second indication information is used to indicate a second time domain resource to be used by the terminal to send or receive second information on a second link.

For example, step S1202 in FIG. 12 is implemented in a plurality of manners, for example, step S1202a, that is, the network device sends the second indication information to the terminal, or step S1202b1 and step S1202b2, that is, the network device sends the second indication information to the terminal by using the another terminal.

It should be noted that for related descriptions of the first indication information, the second indication information, the first time domain resource, the second time domain resource, the first information, and the second information, refer to the embodiment shown in FIG. 6. Details are not described herein again.

S1203: Determine that the first time domain resource overlaps with the second time domain resource.

S1204: When the transmission direction on the first time domain resource is uplink on the first link or downlink on the first link, the terminal cancels receiving or sending, on the second time domain resource, of the second information on the second link.

In this embodiment, a priority of the first information on the first link is higher than a priority of the second information on the second link. Therefore, when the transmission direction on the first time domain resource is uplink or downlink, if the first time domain resource overlaps with the second time domain resource, the terminal cancels receiving/transmitting, on the second time domain resource, of the second information on the second link.

S1205: When the data transmission direction on the first time domain resource is flexible, the terminal sends or receives, on the second time domain resource, the second information on the second link.

It should be noted that in this embodiment, the terminal may send the second information to the network device or receive the second information from the network device, or may send the second information to the another terminal or receive the second information from the another terminal. Details are not described herein again.

When the transmission direction on the first time domain resource is flexible, if the first time domain resource overlaps with the second time domain resource, the terminal receives/transmits, on the second time domain resource, the second information on the second link.

Similarly, the communication method provided in this embodiment is applicable to a plurality of application scenarios. A V2X scenario is used as an example. The first link is a cellular link, and the second link is a sidelink; or the first link is a sidelink, and the second link is a cellular link. An IAB scenario is used as an example. The first link is an access link, and the second link is a backhaul link; or the first link is a backhaul link, and the second link is an access link. For example, the terminal supports a plurality of communications systems. The first link may be a cellular link, a backhaul link, a sidelink, or an access link in a first communications system, and the second link may be a cellular link, a backhaul link, a sidelink, or an access link in a second communications system (specifically, a plurality of cases are included. For example, the first link is the cellular link in the first communications system, and the second link is the cellular link in the second communications system; the first link is the sidelink in the first communications system, and the second link is the sidelink in the second communications system; the first link is the cellular link in the first communications system, and the second link is the sidelink in the second communications system; the first link is the sidelink in the first communications system, and the second link is the cellular link in the second communications system; the first link is the access link in the first communications system, and the second link is the access link in the second communications system; the first link is the backhaul link in the first communications system, and the second link is the backhaul link in the second communications system; the first link is the access link in the first communications system, and the second link is the backhaul link in the second communications system; or the first link is the backhaul link in the first communications system, and the second link is the access link in the second communications system). The first communications system may be an LTE system, and the second communications system may be a 5G system; the first communications system is a 5G system, and the second communications system is an LTE system; the first communications system may be an LTE system, and the second communications system may be an LTE system; or the first communications system may be a 5G system, and the second communications system may be a 5G system.

In this application, when the first link is the access link, and the second link is the backhaul link; or the first link is the backhaul link, and the second link is the access link, the first information/the second information does not need to be limited to any one of control information, data information, and feedback information transmitted on a sidelink. Similarly, when the first link is the access link in the first communications system, and the second link is the access link in the second communications system; the first link is the backhaul link in the first communications system, and the second link is the backhaul link in the second communications system; the first link is the access link in the first communications system, and the second link is the backhaul link in the second communications system; or the first link is the backhaul link in the first communications system, and the second link is the access link in the second communications system, the first information/the second information does not need to be limited to any one of control information (PSCCH), data information (PSSCH), and feedback information (PSFCH) transmitted on a sidelink. For example, the first information/the second information includes at least one of the following information: a physical downlink shared channel (physical DL shared channel, PDSCH), a physical uplink shared channel (physical UL shared channel, PUSCH), a physical downlink control channel (physical DL control channel, PDCCH), a physical uplink control channel (physical UL control channel, PUCCH), a sounding reference signal (sounding reference signal, SRS), a sidelink channel state information reference signal (sidelink channel state information reference signal, SL-CSI-RS), a physical hybrid ARQ indicator channel (physical hybrid ARQ indicator channel, PHICH), and synchronization information. Similarities are not described. To be specific, the first information/the second information may be corresponding information obtained by removing such a specific limitation SL. For example, a channel obtained by removing such a specific limitation SL from a PSCCH may be correspondingly a PUCCH/PDCCH.

Descriptions are provided below by using a V2X scenario as an example and by using an example in which the first link is a cellular link, and the second link is a sidelink.

Example 1

The first indication information is used to indicate the first time domain resource to be used by the terminal to receive downlink data on the first link (the cellular link), and the second indication information is used to indicate the second time domain resource to be used by the terminal to send or receive the second information on the second link (the sidelink). In this case, if the first time domain resource overlaps with the second time domain resource, the terminal cancels receiving or sending of the second information on the second time domain resource.

It should be noted that resource configuration includes: configuring a transmission direction on the resource and/or configuring information that the resource is used to receive/transmit. One symbol is used as an example. The symbol may indicate that a transmission direction is UL, and higher layer signaling is used to indicate uplink data specifically transmitted on the symbol. Therefore, in Example 1, that the first indication information is used to indicate the first time domain resource to be used by the terminal to receive downlink data on the first link (the cellular link) may include two cases:

Case 1: The first indication information is used to indicate a transmission direction of the first time domain resource (for example, the first indication information is a slot format configuration, an SL slot format configuration, or an SFI). It is assumed that the first indication information is used to indicate that a status of a symbol on the first time domain resource is DL. In this case, after obtaining the second indication information, the terminal cancels receiving or sending, on the second time domain resource, of the second information on the sidelink.

For example, a status on the first time domain resource is DL, and a status on the second time domain resource is sidelink. If the first time domain resource overlaps with the second time domain resource, it indicates that the first time domain resource overlaps with the second time domain resource in uplink and downlink transmission directions. In this case, the terminal cancels transmitting, on the second time domain resource, of data on the sidelink. That a status on the first time domain resource is DL is specifically: The status on the first time domain resource is DL on the cellular link. That a status on the second time domain resource is sidelink is specifically: The status on the second time domain resource is transmission or reception on the sidelink.

In conclusion, DCI on a Uu interface indicates a transmission direction of a symbol on the cellular link, and a semi-static sidelink slot format configuration (including TDD-UL-DL-SL-ConfigCell and/or TDD-UL-DL-SL-ConfigDedicated) used to indicate the sidelink, an SFI-SL in a slot format, DCI 5A, or new DCI used to schedule sidelink transmission is used to indicate a transmission direction on the sidelink. Therefore, the transmission direction indicated by the semi-static sidelink slot format configuration, the SFI-SL, the Uu interface, or the DCI does not need to conflict with the transmission direction indicated by the DCI on the Uu interface.

Alternatively, a semi-static sidelink slot format configuration (including TDD-UL-DL-SL-ConfigCell and/or TDD- UL-DL-SL-ConfigDedicated) or an SFI-SL indicates a transmission direction of a symbol on the sidelink, and TDD-UL-DL-ConfigurationCommon, TDD-UL-DL-ConfigDedicated, or SFI TDD indicates a transmission direction of a symbol on the cellular link. Therefore, the transmission direction indicated by the semi-static sidelink slot format configuration (including TDD-UL-DL-SL-ConfigCell and/or TDD-UL-DL-SL-ConfigDedicated) or the SFI-SL does not need to conflict with the transmission direction indicated by TDD-UL-DL-ConfigurationCommon, TDD-UL-DL-ConfigDedicated, or the SFI TDD configuration.

For another example, if one UE is scheduled to receive a PDSCH in a plurality of slots on the SL, and the second indication information indicates that at least one symbol in one of the plurality of slots is scheduled for receiving the PDSCH and is configured as an uplink symbol, it indicates that resources overlap and transmission directions conflict, and therefore the UE cancels receiving of the PDSCH in the slot. It should be noted that in this example, the scheduled (scheduled) PDSCH/PUSCH in the plurality of slots is received on the SL through slot aggregation or SPS. The second indication information may be TDD-UL-DL-ConfigurationCommon, TDD-UL-DL-ConfigDedicated, or a semi-static sidelink slot format configuration.

Case 2: The first indication information is used to indicate to receive, on the first time domain resource, downlink data on the cellular link (for example, the first indication information is DCI). In this case, after obtaining the second indication information, the terminal cancels receiving/transmitting, on the second time domain resource, of the second information on the sidelink.

It should be noted that in this embodiment, specific downlink data on the cellular link is not limited, for example, may be a PDSCH or a PDCCH.

Example 2

The first indication information is used to indicate the first time domain resource to be used by the terminal to send uplink data on the first link (the cellular link), and the second indication information is used to indicate the second time domain resource to be used by the terminal to send or receive the second information on the second link (the sidelink). In this case, if the first time domain resource overlaps with the second time domain resource, the terminal cancels receiving or sending of the second information on the second time domain resource.

It should be understood that in Example 2, that the first indication information is used to indicate the first time domain resource to be used by the terminal to send uplink data on the first link (the cellular link) may include a plurality of cases.

Case 1: The first indication information is used to indicate that a transmission direction on the first time domain resource is UL. In this case, after obtaining the second indication information, the terminal cancels receiving/transmitting, on the second time domain resource, of the second information on the sidelink.

For example, a status on the first time domain resource is UL, and a status on the second time domain resource is sidelink. If the first time domain resource overlaps with the second time domain resource, it indicates that uplink and downlink transmission resources overlap and uplink and downlink transmission directions conflict between the first time domain resource and the second time domain resource. In this case, the terminal cancels transmitting, on the second time domain resource, of data on the sidelink. That a transmission direction on the first time domain resource is UL is specifically: The transmission direction on the first time domain resource is UL on the cellular link. That a status on the second time domain resource is sidelink is specifically: The status on the second time domain resource is sending or reception on the sidelink.

For another example, if one UE is scheduled to send a PUSCH in a plurality of slots on the SL, and TDD-UL-DL-ConfigurationCommon or TDD-UL-DL-ConfigDedicated indicates that at least one symbol in one of the plurality of slots is scheduled for sending the PUSCH and is configured as a downlink symbol, the UE does not send the PUSCH in the slot. The scheduled (scheduled) PDSCH/PUSCH in the plurality of slots is sent on the SL through slot aggregation or SPS.

Case 3: The first indication information is used to indicate to send, on the first time domain resource, uplink data on the cellular link. In this case, after obtaining the second indication information, the terminal cancels receiving/transmitting of the second information on the second time domain resource.

It should be noted that in this embodiment, specific uplink data is not limited, for example, may be a PUSCH or a PUCCH.

Figure 13:
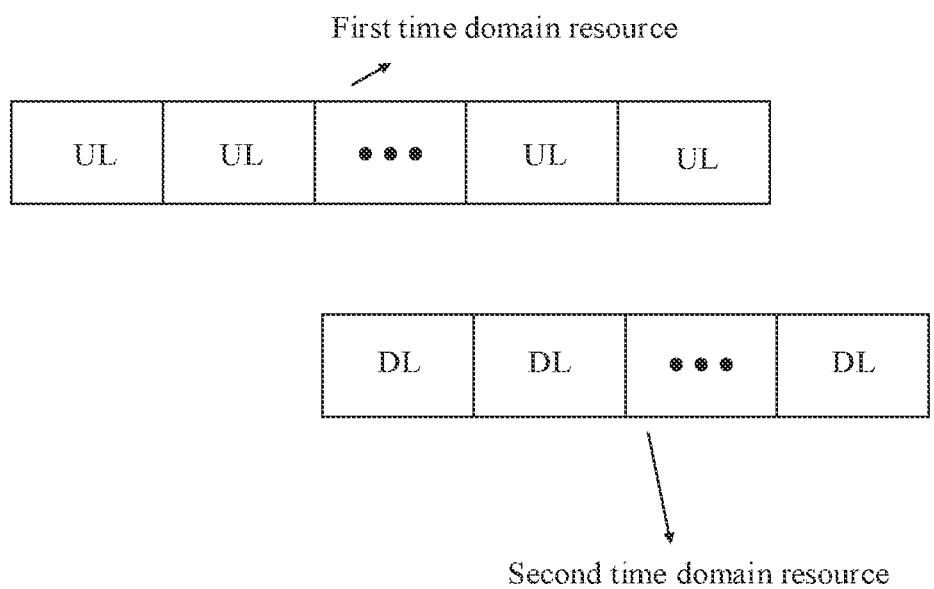
FIG. 13 is a schematic diagram of a first time domain resource and a second time domain resource according to an embodiment of the present invention.

Refer to FIG. 13. The first time domain resource is M symbols in one slot, and the M symbols are UL symbols. The second time domain resource is N symbols in one slot, and the N symbols are DL symbols. The first time domain resource overlaps with the second time domain resource, that is, at least one of the M symbols overlaps with at least one of the N symbols. In this case, the terminal cancels receiving, on the second time domain resource, of the second information on the sidelink.

Therefore, it can be learned from Example 1 and Example 2 that if the first indication information indicates that a series of symbols in one slot are DL/UL symbols, the UE does not expect to detect the second indication information, where the second indication information is used to indicate that the series of symbols are used to transmit/receive data on the sidelink. The first indication information may be TDD-UL-DL-ConfigurationCommon, TDD-UL-DL-ConfigDedicated, or an SFI. The second indication information may be an SFI-SL, TDD-UL-DL-SL-ConfigDedicated/TDD-UL-DL-ConfigDedicated-SL/TDD-UL-DL-SL-ConfigCommon, an SFI-index in an SFI-SL, or an SFI-index in TDD-UL-DL-SL-ConfigDedicated/TDD-UL-DL-ConfigDedicated-SL/TDD-UL-DL-SL-ConfigCommon.

In some other embodiments, if TDD-UL-DL-ConfigurationCommon, TDD-UL-DL-ConfigDedicated, or an SFI indicates that a series of symbols in one slot is DL/UL symbols, the UE does not expect to detect an SFI-SL or TDD-UL-DL-SL-ConfigDedicated/TDD-UL-DL-ConfigDedicated-SL/TDD-UL-DL-SL-ConfigCommon, where an SFI-index in the SFI-SL or TDD-UL-DL-SL-ConfigDedicated/TDD-UL-DL-ConfigDedicated-SL/TDD-UL-DL-SL-ConfigCommon indicates that the series of symbols in the slot are flexible symbols.

Example 3

If the first time domain resource overlaps with the second time domain resource, and a transmission direction on the first time domain resource is flexible, the terminal sends or receives the second information on the second time domain resource.

It should be noted that the transmission direction on the first time domain resource is flexible. This indicates that the transmission direction on the first time domain resource may change. Therefore, when the first time domain resource overlaps with the second time domain resource, the terminal may receive/transmit, on the second time domain resource, the second information on the sidelink.

Embodiment 4

It can be learned from the foregoing content that a symbol on the cellular link includes three states: UL, DL, and F. In a scenario in which a system (for example, 5G NR) includes only the cellular link, the terminal does not receive/transmit data on the F symbol. However, in a scenario in which the cellular link and the sidelink are included, when the terminal does not receive/transmit data on the F symbol, the following condition needs to be met.

The terminal does not obtain indication information, where the indication information is used to indicate the F symbol to be used by the terminal to receive/transmit SL data. Alternatively, the terminal obtains indication information, where the indication information does not indicate the terminal to receive/transmit SL data on the F symbol. The indication information may be a semi-static SL slot format configuration, SCI, DCI on a Uu interface, an SFI-SL, or the like.

The symbol on the cellular link is configured for uplink sending by using higher layer signaling. If the terminal needs to perform uplink sending, the following conditions need to be met.

1. The terminal obtains first indication information, where the first indication information is used to indicate that the symbol is a UL symbol, and the first indication information may be DCI.

2. The terminal does not obtain indication information, where the indication information is used to indicate the symbol to be used by the terminal to receive/transmit SL data. Alternatively, the terminal obtains indication information, where the indication information does not indicate the terminal to receive/transmit SL data on the symbol. The indication information may be a semi-static SL slot format configuration, SCI, an SFI-SL, or the like.

The symbol on the cellular link is configured for downlink reception by using higher layer signaling. If the terminal needs to perform downlink reception, the following conditions need to be met.

1. The terminal obtains first indication information, where the first indication information is used to indicate that the symbol is a DL symbol, and the first indication information may be DCI.

2. The terminal does not obtain indication information, where the indication information is used to indicate the symbol to be used by the terminal to receive/transmit SL data. Alternatively, the terminal obtains indication information, where the indication information does not indicate the terminal to receive/transmit SL data on the symbol. The indication information may be a semi-static SL slot configuration, SCI, an SFI-SL, or the like.

PDCCH detection is performed on the first time domain resource configured by using higher layer signaling. If the terminal performs PDCCH detection on the first time domain resource, the following condition needs to be met.

The terminal does not obtain indication information, where the indication information is used to indicate a resource that overlaps with the first time domain resource and that is to be used by the terminal to receive/transmit SL data.

Alternatively, the terminal obtains indication information, where the indication information does not indicate the terminal to receive/transmit SL data on a resource that overlaps with the first time domain resource. The indication information may be a semi-static SL slot configuration, DCI on a Uu interface, SCI, an SFI-SL, or the like.

The SL data includes a PSCCH, a PSSCH, an SL-SRS, an SL-CSI-RS, a PSFCH, or the like.

Embodiment 5

In the foregoing embodiments, how the terminal performs processing after the terminal obtains the first indication information and the second indication information, if the first time domain resource indicated by the first indication information overlaps with the second time domain resource indicated by the second indication information is described. In this embodiment, the terminal obtains the first indication information, where the first indication information is used to indicate the first time domain resource to be used by the terminal to receive or send the first information on the first link. In this case, at least one symbol on the first time domain resource is not configured for receiving/transmitting the second information on the second link.

Specifically, if the first time domain resource is configured for receiving/transmitting the first information on the first link, the terminal or the network device cancels a case in which the at least one symbol on the first time domain resource is configured for receiving/transmitting the second information on the second link. To be specific, in the foregoing embodiments, how the terminal performs processing after one time domain resource is configured for receiving/transmitting the first information on the first link, and one or more symbols on the first time domain resource are also configured for receiving/transmitting the second information on the second link is described. In this embodiment, one symbol cannot be configured for receiving/transmitting both the first information on the first link and the second information on the second link.

For example, for a series of symbols in one slot, if the first indication information is indicated by the network device to the UE to receive an SS/PBCH block, the UE does not expect to detect a semi-static SL slot format configuration or an SFI-SL, where an SFI-index field in the SFI-SL indicates that the series of symbols in the slot are used for sidelink transmission. The first indication information may be ssb-PositionsInBurst in SystemInformationBlockType1 or ssb-PositionsInBurst in ServingCellConfigCommon.

That the UE does not expect to detect a semi-static SL slot configuration or an SFI-SL includes: The terminal or the network device does not further configure, for sending SL data, the series of symbols configured for receiving the SS/PBCH block.

If one symbol is configured for receiving/transmitting the first information on the first link, once the symbol is further configured for receiving/transmitting the second information on the second link, the terminal may determine, based on priorities of the first information and the second information, which piece of information is to be received/transmitted. Details are described in the foregoing embodiments. The details are not described herein again.

For example, for a series of symbols in one slot, the first indication information is indicated by the network device to the UE to receive an SS/PBCH block. The terminal obtains the second indication information, where the second indication information is used to indicate to transmit, on the second time domain resource, a PSSCH, a PSCCH, or a PHICH scheduled on the sidelink. If the first time domain resource overlaps with the second time domain resource, the UE cancels transmitting, in the slot, of the PSSCH, the PSCCH, or the PHICH scheduled on the sidelink. The first indication information may be ssb-PositionsInBurst in SysteminformationBlockType1 or ssb-PositionsInBurst in ServingCellConfigCommon.

For another example, for a series of symbols in one slot, the first indication information is indicated by the network device to the UE to receive an SS/PBCH block. The terminal obtains the second indication information, where the second indication information is used to indicate to transmit an RS (including an SL-CSI-RS, an SRS, or the like) on the second time domain resource. If the first time domain resource overlaps with the second time domain resource, the UE cancels transmitting of the RS (including the SL-CSI-RS, the SRS, or the like) in the slot.

For another example, for a series of symbols in one slot, the first indication information is indicated by the network device to the terminal (UE) to receive/transmit first URLLC data on a Uu interface. The terminal obtains the second indication information, where the second indication information is used to indicate to transmit, on the second time domain resource, second URLLC data on the SL. If the first time domain resource overlaps with the second time domain resource, the UE determines, based on priorities of the first URLLC data and the second URLLC data, whether to cancel receiving/transmitting of the first URLLC data/the second URLLC data. For example, when the priority of the first URLLC data is higher than the priority of the second URLLC data, the UE receives/transmits the first URLLC data on the first time domain resource, and the UE cancels receiving/transmitting of the second URLLC data on the second time domain resource. For another example, when the priority of the first URLLC data is lower than the priority of the second URLLC data, the UE cancels receiving/transmitting of the first URLLC data on the first time domain resource, and the UE transmits the second URLLC data on the second time domain resource.

Embodiment 6

When transmission of a sidelink synchronization signal block (a sidelink SS block or an SL-SSB) is considered in a V2X scenario, a resource used to transmit the SL-SSB may conflict with a resource used to transmit data on a cellular link. The following solutions for resolving the conflict may be used.

1. A priority of the SL-SSB is higher than a priority of the data that is on the cellular link and that is configured by using higher layer signaling. The data that is on the cellular link and that is configured by using the higher layer signaling includes a PRACH or URLLC data.

For example, the priority of the SL-SSB may be higher than a priority of the PRACH. Therefore, the terminal obtains first indication information, where the first indication information is used to indicate the first time domain resource to be used by the terminal to send the PRACH. The terminal obtains second indication information, where the second indication information is used to indicate the second time domain resource to be used by the terminal to send the SL-SSB. If the first time domain resource overlaps with the second time domain resource, the terminal cancels sending of the PRACH on the first time domain resource, and sends the SL-SSB on the second time domain resource. In this case, the terminal may discard the first indication information, and/or discard the to-be-sent PRACH.

For another example, the priority of the SL-SSB may be higher than or lower than a priority of the URLLC data on a Uu interface. For example, the priority of the SL-SSB is higher than the priority of the URLLC data. The terminal obtains first indication information, where the first indication information is used to indicate the first time domain resource to be used by the terminal to send the URLLC data The terminal obtains second indication information, where the second indication information is used to indicate the second time domain resource to be used by the terminal to send the SL-SSB. If the first time domain resource overlaps with the second time domain resource, the terminal cancels sending of the URLLC data on the first time domain resource, and sends the SL-SSB on the second time domain resource. In this case, the terminal may discard the first indication information, and/or discard the to-be-sent URLLC data.

Embodiment 7

For a series of symbols in one slot, if the UE detects that a DCI format 1_0, a DCI format 1_1, or a DCI format 0_1 indicates the UE to receive, on the series of symbols in the slot, the first information on the first link (for example, the first link is a cellular link, and the first information is a PDSCH and/or a CSI-RS), the UE does not expect to detect a semi-static SL slot format configuration or an SFI-SL, where an SFI-index field in the SFI-SL indicates that the series of symbols in the slot are used to transmit/receive the second information on the second link (for example, second information on a sidelink), or does not expect to detect that DCI on a Uu interface indicates that the series of symbols in the slot are used for sidelink transmission/reception.

For a series of symbols in one slot, if the UE detects that a DCI format 0_0, a DCI format 0_1, a DCI format 1_0, a DCI format 1_1, a DCI format 2_3, or an RAR UL grant indicates the UE to transmit, on the series of symbols in the slot, the first information on the first link (for example, the first link is a cellular link, and the first information includes one or more of a PUSCH, a PUCCH, a PRACH, or an SRS), the UE does not expect to detect a semi-static SL slot configuration or an SFI-SL, where an SFI-index field in the SFI-SL indicates that the series of symbols in the slot are used to transmit/receive the second information on the second link (for example, second information on a sidelink), or does not expect to detect that DCI on a Uu interface indicates that the series of symbols in the slot are used for sidelink transmission/reception.

It should be noted that in this application, when the first link is the cellular link, and the second link is the sidelink, specific first information and specific second information are described in detail in Embodiment 1. Specific content of the first information and the second information is applicable to any one of the embodiments of this application. Therefore, the specific first information and the specific second information are not described in this embodiment.

Embodiment 8

Figure 14:
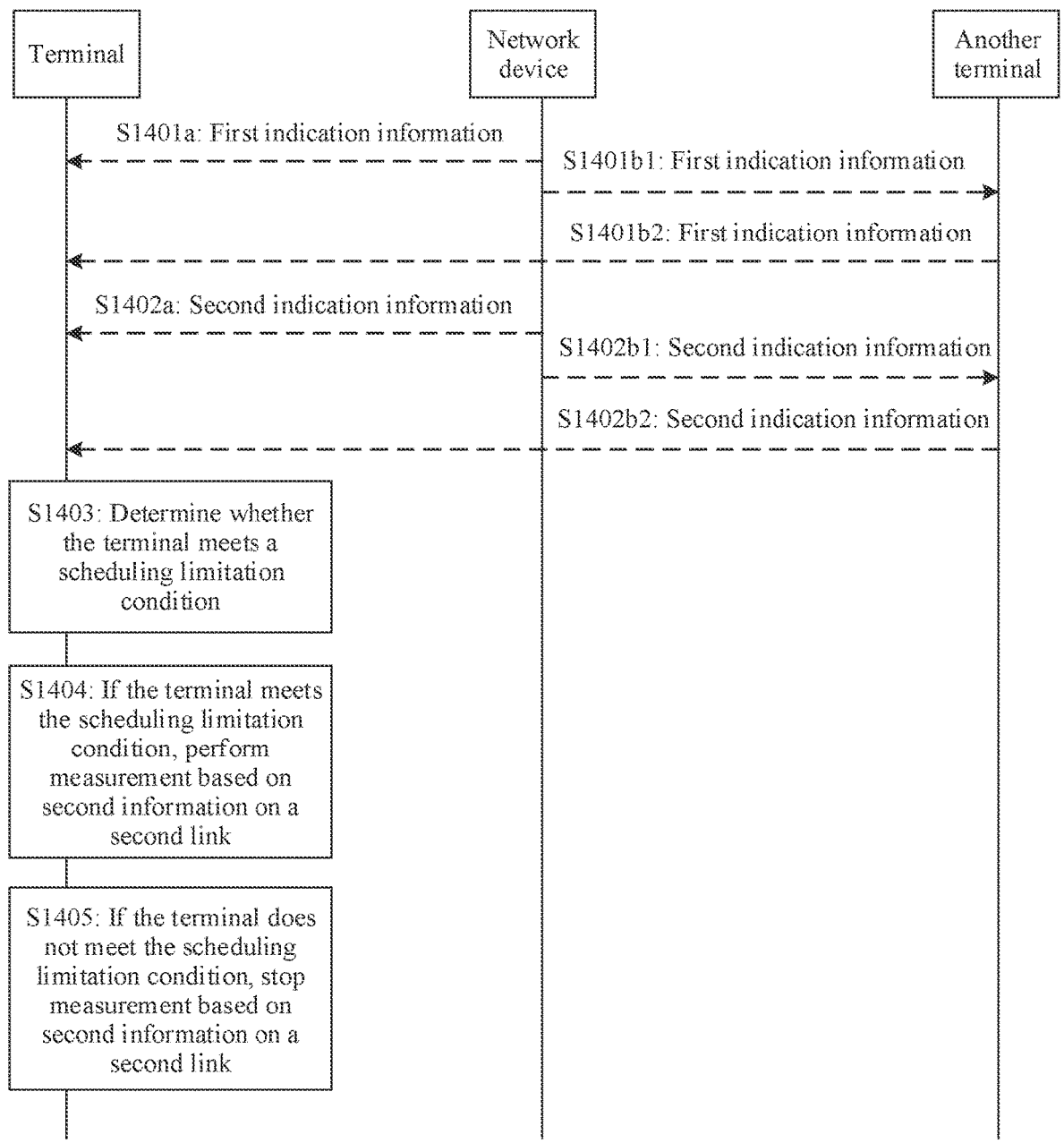
FIG. 14 is a schematic diagram of a procedure of a communication method according to an embodiment of the present invention.

FIG. 14 is a schematic diagram of a procedure of a communication method according to an embodiment of this application. As shown in FIG. 14, the procedure includes the following steps.

S1401: A terminal obtains first indication information, where the first indication information is used to indicate a first time domain resource to be used by the terminal to receive or send first information on a first link.

For example, step S1401 in FIG. 14 is implemented in a plurality of manners, for example, step S1401a, that is, a network device sends the first indication information to the terminal, or step S1401b1 and step S1401b2, that is, a network device sends the first indication information to the terminal by using another terminal.

S1402: The terminal obtains second indication information, where the second indication information is used to indicate a second time domain resource to be used by the terminal to receive or send second information on a second link.

For example, step S1402 in FIG. 14 is implemented in a plurality of manners, for example, step S1402, that is, the network device sends the second indication information to the terminal, or step S1402, that is, the network device sends the second indication information to the terminal by using the another terminal.

S1403: The terminal determines whether the terminal meets a scheduling limitation condition.

S1404: If the terminal meets the scheduling limitation condition, perform measurement based on the second information on the second link.

That the terminal meets the scheduling limitation condition may be: A scheduling limitation of the terminal is applicable or the terminal has a scheduling limitation.

S1405: If the terminal does not meet the scheduling limitation condition, stop measurement based on the second information on the second link.

That the terminal does not meet the scheduling limitation condition may be: A scheduling limitation of the terminal is not applicable or the terminal does not have a scheduling limitation.

The communication method provided in this embodiment is applicable to a plurality of application scenarios. A V2X scenario is used as an example. The first link is a cellular link, and the second link is a sidelink; or the first link is a sidelink, and the second link is a cellular link. An IAB scenario is used as an example. The first link is an access link, and the second link is a backhaul link, or the first link is a backhaul link, and the second link is an access link. For example, the terminal supports a plurality of communications systems. The first link may be a cellular link, a backhaul link, a sidelink, or an access link in a first communications system, and the second link may be a cellular link, a backhaul link, a sidelink, or an access link in a second communications system (specifically, a plurality of cases are included. For example, the first link is the cellular link in the first communications system, and the second link is the cellular link in the second communications system; the first link is the sidelink in the first communications system, and the second link is the sidelink in the second communications system; the first link is the cellular link in the first communications system, and the second link is the sidelink in the second communications system; or the first link is the sidelink in the first communications system, and the second link is the cellular link in the second communications system). The first communications system may be an LTE system, and the second communications system may be a 5G system; the first communications system is a 5G system, and the second communications system is an LTE system; the first communications system may be an LTE system, and the second communications system may be an LTE system; or the first communications system may be a 5G system, and the second communications system may be a 5G system.

In this application, when the first link is the access link, and the second link is the backhaul link; or the first link is the backhaul link, and the second link is the access link, the first information/the second information does not need to be limited to any one of control information, data information, and feedback information transmitted on a sidelink. Similarly, when the first link is the access link in the first communications system, and the second link is the access link in the second communications system; the first link is the backhaul link in the first communications system, and the second link is the backhaul link in the second communications system; the first link is the access link in the first communications system, and the second link is the backhaul link in the second communications system; or the first link is the backhaul link in the first communications system, and the second link is the access link in the second communications system, the first information/the second information does not need to be limited to any one of control information (PSCCH), data information (PSSCH), and feedback information (PSFCH) transmitted on a sidelink. For example, the first information/the second information includes at least one of the following information: a physical downlink shared channel (physical DL shared channel, PDSCH), a physical uplink shared channel (physical UL shared channel, PUSCH), a physical downlink control channel (physical DL control channel, PDCCH), a physical uplink control channel (physical UL control channel, PUCCH), a sounding reference signal (sounding reference signal, SRS), a sidelink channel state information reference signal (sidelink channel state information reference signal, SL-CSI-RS), a physical hybrid ARQ indicator channel (physical hybrid ARQ indicator channel, PHICH), and synchronization information. Similarities are not described. To be specific, the first information/the second information may be corresponding information obtained by removing such a specific limitation SL. For example, a channel obtained by removing such a specific limitation SL from a PSCCH may be correspondingly a PUCCH/PDCCH.

Descriptions are provided below by using a V2X scenario as an example and by using an example in which the first link is a sidelink, and the second link is a cellular link.

The terminal obtains first indication information, where the first indication information is used to indicate a first time domain resource to be used by the terminal apparatus to receive or send one or more of a physical sidelink shared channel PSSCH, a physical sidelink control channel PSCCH, a sidelink sounding reference signal SL-SRS, a sidelink channel state information reference signal SL-CSI-RS, and a physical sidelink feedback channel PSFCH on a first link.

When the terminal meets a condition in which a scheduling limitation is not applicable or there is no scheduling limitation, the terminal stops measurement based on the second information on the cellular link. When the terminal meets a condition in which a scheduling limitation is applicable or there is a scheduling limitation, the terminal performs measurement based on the second information on the cellular link.

Alternatively, when the terminal meets a condition in which a scheduling limitation is not applicable or there is no scheduling limitation, the terminal performs measurement based on the second information. When the terminal meets a condition in which a scheduling limitation is applicable or there is a scheduling limitation, the terminal stops measurement based on the second information.

In this application, "stop" may be replaced with "cancel".

That the terminal determines whether the terminal meets a scheduling limitation condition includes: determining whether scheduling is applicable, determining whether there is a scheduling limitation, or determining whether a scheduling limitation is applicable. Usually, only one manner is used in the system. Scheduling is preferentially performed if scheduling is applicable (there is the scheduling limitation or the scheduling limitation is applicable, where this name is not limited in this embodiment of this application). RRM measurement is preferentially performed if scheduling is not applicable (there is no scheduling limitation or the scheduling limitation is not applicable, where this name is not limited in this embodiment of this application). Certainly, alternatively, RRM measurement is preferentially performed if scheduling is applicable (there is the scheduling limitation or the scheduling limitation is applicable, where this name is not limited in this embodiment of this application). Scheduling is preferentially performed if scheduling is not applicable (there is no scheduling limitation or the scheduling limitation is not applicable, where this name is not limited in this embodiment of this application).

RRM measurement continues to be used as an example. When the terminal meets a condition in which scheduling is not applicable or there is no scheduling limitation, the terminal may stop RRM measurement based on the second information (for example, a CSI-RS), and receive/transmit the first information. When the terminal meets a condition in which a scheduling limitation is applicable or there is a scheduling limitation, the terminal stops receiving/transmitting of the first information, and performs RRM measurement based on the second information (for example, a CSI-RS). Alternatively, when the terminal meets a condition in which a scheduling limitation is applicable or there is a scheduling limitation, the terminal may stop RRM measurement based on the second information (for example, a CSI-RS), and receive/transmit the first information. When the terminal meets a condition in which scheduling is not applicable or there is no scheduling limitation, the terminal stops receiving/transmitting of the first information, and performs RRM measurement based on the second information (for example, a CSI-RS). In this way, RRM measurement can be ensured when RRM measurement is not limited by scheduling. On the contrary, scheduling is preferentially performed when RRM measurement is limited by scheduling. The scheduling limitation is a scheduling limitation affected by RRM measurement, that is, the scheduling limitation is that scheduled receiving/transmitting is affected by RRM measurement or restricted by RRM measurement.

Measurement may be radio resource management (radio resource management, RRM) measurement, synchronization signal-based measurement, or physical broadcast channel block-based measurement. This is not limited in this embodiment of this application. RRM measurement includes CSI-RS or DMRS-based measurement, synchronization signal-based measurement includes SS or SSB-based measurement, and physical broadcast channel block-based measurement includes PBCH block-based measurement.

It should be noted that bandwidth transmission is supported in a 5G NR system. To ensure quality of service of the terminal in a limited bandwidth condition, the system supports flexible resource allocation and dynamic adjustment for the terminal, to maximize resource utilization. The system supports two resource allocation manners: scheduling and measurement (for example, RRM measurement). RRM measurement focuses on scenarios such as cell reselection and handover (for example, the terminal may receive an RRM measurement report on another cell that is not a serving cell, and determine, based on the RRM measurement report, whether to perform cell handover). Usually, only one manner is used in the system. Scheduling is preferentially performed if scheduling is applicable (there is the scheduling limitation or the scheduling limitation is applicable, where this name is not limited in this embodiment of this application). RRM measurement is preferentially performed if scheduling is not applicable (there is no scheduling limitation or the scheduling limitation is not applicable, where this name is not limited in this embodiment of this application). Certainly, alternatively, RRM measurement is preferentially performed if scheduling is applicable (there is the scheduling limitation or the scheduling limitation is applicable, where this name is not limited in this embodiment of this application). Scheduling is preferentially performed if scheduling is not applicable (there is no scheduling limitation or the scheduling limitation is not applicable, where this name is not limited in this embodiment of this application).

RRM measurement continues to be used as an example. When the terminal meets a condition in which scheduling is not applicable or there is no scheduling limitation, the terminal may stop RRM measurement based on the second information (for example, a CSI-RS), and receive/transmit the first information. When the terminal meets a condition in which a scheduling limitation is applicable or there is a scheduling limitation, the terminal stops receiving/transmitting of the first information, and performs RRM measurement based on the second information (for example, a CSI-RS). Alternatively, when the terminal meets a condition in which a scheduling limitation is applicable or there is a scheduling limitation, the terminal may stop RRM measurement based on the second information (for example, a CSI-RS), and receive/transmit the first information. When the terminal meets a condition in which scheduling is not applicable or there is no scheduling limitation, the terminal stops receiving/transmitting of the first information, and performs RRM measurement based on the second information (for example, a CSI-RS). In this way, RRM measurement can be ensured when RRM measurement is not limited by scheduling. On the contrary, scheduling is preferentially performed when RRM measurement is limited by scheduling. The scheduling limitation is a scheduling limitation affected by RRM measurement, that is, the scheduling limitation is that scheduled receiving/transmitting is affected by RRM measurement or restricted by RRM measurement.

For another example, for unpaired spectral operations on a cell in a frequency band FR 1, when a scheduling limitation is not applicable, if UE detects that DCI (DCI 0_0, DCI 0_1, DCI 1_0, DCI 1_1, or DCI 2_3) indicates the UE to transmit data on a series of symbols, or the UE detects that DCI (used to schedule SL) on a Uu interface or an SFI-SL indicates the UE to transmit/receive SL data (for example, a PSSCH/PSCCH/SL-SRS/SL-CSI-RS) on at least one of the series of symbols, the UE is not required to perform RRM measurement (for example, is not required to receive an RRM measurement report on another cell in the frequency band FR 1 based on an SS/PBCH block or a CSI-RS).

Synchronization signal-based measurement is used as an example. When the terminal meets a condition in which scheduling is not applicable or there is no scheduling limitation, the terminal may stop measurement based on the second information (for example, an SS block), and receive/transmit the first information. When the terminal meets a condition in which a scheduling limitation is applicable or there is a scheduling limitation, the terminal stops receiving/transmitting of the first information, and performs measurement based on the second information (for example, a CSI-RS). Alternatively, when the terminal meets a condition in which a scheduling limitation is applicable or there is a scheduling limitation, the terminal may stop measurement based on the second information (for example, an SS block), and receive/transmit the first information. When the terminal meets a condition in which scheduling is not applicable or there is no scheduling limitation, the terminal stops receiving/transmitting of the first information, and performs measurement based on the second information (for example, a CSI-RS).

Optionally, RRM measurement may alternatively include SS or SS block-based measurement or physical broadcast channel block (PBCH block)-based measurement. Details are not described again.

Figure 15:
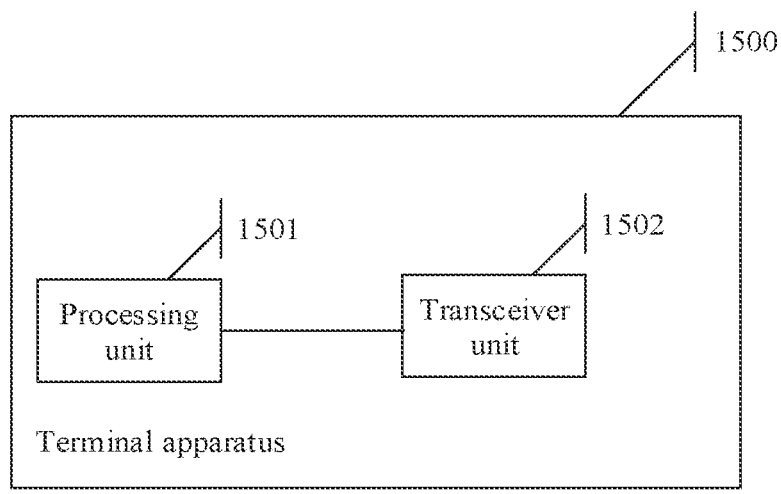
FIG. 15 is a schematic structural diagram of a terminal apparatus according to an embodiment of the present invention.

Based on a same inventive concept as the method embodiments, an embodiment of this application further provides a terminal apparatus, configured to perform the method performed by the terminal in the foregoing method embodiments. For a related feature, refer to the foregoing method embodiments. Details are not described herein again. As shown in FIG. 15, the terminal apparatus 1500 includes a processing unit 1501 and a transceiver unit 1502.

It should be noted that the apparatus shown in FIG. 15 may be an entire terminal or an entire network device, may be a component or a combination of a plurality of components that can perform the following method procedure in the terminal or the network device, may be a chip or a chip system that can implement the following method procedure in the terminal or the network device, or the like. This is not limited in this embodiment of this application.

When the terminal apparatus is a network device or a terminal, the transceiver unit may be a transceiver and may include an antenna, a radio frequency circuit, and the like, and the processing unit may be a processor, for example, a central processing unit (central processing unit, CPU). Alternatively, the transceiver may be a discrete receiver and a discrete transmitter.

When the terminal apparatus is a component having a function of the network device or the terminal, the transceiver unit may be a radio frequency unit, and the processing module may be a processor.

When the terminal apparatus is a chip system, the transceiver unit may be an input interface or an output interface of the chip system, and the processing module may be a processor of the chip system.

The processing unit 1501 is configured to obtain first indication information, where the first indication information is used to indicate a first time domain resource to be used by the terminal apparatus to send or receive first information on a first link.

The processing unit 1501 is further configured to obtain second indication information, where the second indication information is used to indicate a second time domain resource to be used by the terminal apparatus to send or receive second information on a second link.

The processing unit 1501 is further configured to: when the first time domain resource overlaps with the second time domain resource, trigger the transceiver unit 1502 to send or receive the first information on the first time domain resource, and/or trigger the transceiver unit 1502 to cancel receiving or sending of the second information on the second time domain resource. Alternatively, the processing unit 1501 is further configured to: when the first time domain resource overlaps with a third time domain resource, trigger the transceiver unit 1502 to send or receive the first information on the first time domain resource, and/or trigger the transceiver unit 1502 to cancel receiving or sending of the second information on the second time domain resource, where an end time point of the third time domain resource is a start time point of the second time domain resource.

The transceiver unit 1502 may be a receiving unit and a sending unit. Specifically, that the transceiver unit 1502 sends or receives the first information on the first time domain resource includes: The receiving unit receives the first information on the first time domain resource, or the sending unit sends the first information on the first time domain resource. That the transceiver unit 1502 cancels receiving or sending of the second information on the second time domain resource includes: The receiving unit cancels receiving of the second information on the second time domain resource, or the sending unit cancels sending of the second information on the second time domain resource.

In a possible implementation, the first time domain resource is at least one first slot, and the second time domain resource is at least one second slot; the first time domain resource is at least one first symbol, and the second time domain resource is at least one second symbol; the first time domain resource is M symbols in at least one first slot, and the second time domain resource is N symbols in at least one second slot, where M is an integer greater than or equal to 1, and N is an integer greater than or equal to 1; the first time domain resource is at least one first slot, and the second time domain resource is at least one second symbol; or the first time domain resource is at least one first symbol, and the second time domain resource is at least one second slot.

In a possible implementation, that the first time domain resource overlaps with the second time domain resource includes: the first time domain resource completely or partially overlaps with the second time domain resource.

In a possible implementation, that the first time domain resource overlaps with the third time domain resource includes: the first time domain resource completely or partially overlaps with the third time domain resource.

In a possible implementation, the first link is a cellular link, and the second link is a sidelink; or the first link is a backhaul link, and the second link is an access link.

In a possible implementation, the first indication information is used to indicate the first time domain resource to be used by the terminal apparatus to receive the first information on the first link, and the first information includes at least one of the following information: a synchronization signal block SS block, a physical broadcast channel block PBCH block, synchronization information, and a control resource set CORESET.

In a possible implementation, the first indication information is used to indicate the first time domain resource to be used by the terminal apparatus to send the first information on the first link, and the first information includes at least one of the following information: information carried on a physical random access channel PRACH and ultra-reliable and low-latency communication URLLC data.

In a possible implementation, the second link is the sidelink, the second indication information is used to indicate the second time domain resource to be used by the terminal apparatus to send or receive the second information on the second link, and the second information includes at least one of the following information: information carried on a physical sidelink shared channel PSSCH, information carried on a physical sidelink control channel PSCCH, a sidelink sounding reference signal SL-SRS, a sidelink channel state information reference signal SL-CSI-RS, and information carried on a physical sidelink feedback channel PSFCH.

In a possible implementation, the first link is a sidelink, and the second link is a cellular link; or the first link is an access link, and the second link is a backhaul link.

In a possible implementation, the first link is the sidelink, the first indication information is used to indicate the first time domain resource to be used by the terminal apparatus to send or receive the first information on the first link, and the first information includes at least one of the following information: information carried on a PSSCH, information carried on a PSCCH, an SL-SRS, an SL-CSI-RS, and information carried on a PSFCH.

In a possible implementation, the second indication information is used to indicate the second time domain resource to be used by the terminal apparatus to send the second information on the second link, and the second information includes at least one of the following information: a sounding reference signal SRS, information carried on a physical uplink control channel PUCCH, and information carried on a physical uplink shared channel PUSCH.

In a possible implementation, the second indication information is used to indicate the second time domain resource to be used by the terminal apparatus to receive the second information on the second link, and the second information includes at least one of the following information: a channel state information reference signal CSI-RS and a demodulation reference signal DMRS.

In a possible implementation, the first indication information is sent by the network device or is preconfigured; and the second indication information is sent by the network device or is preconfigured.

In a possible implementation, the first link is a link in a first communications system, and the second link is a link in a second communications system. The first communications system is an LTE system, and the second communications system is a 5G system; the first communications system is a 5G system, and the second communications system is an LTE system; or the first communications system is a 5G system, and the second communications system is a 5G system.

Figure 16:
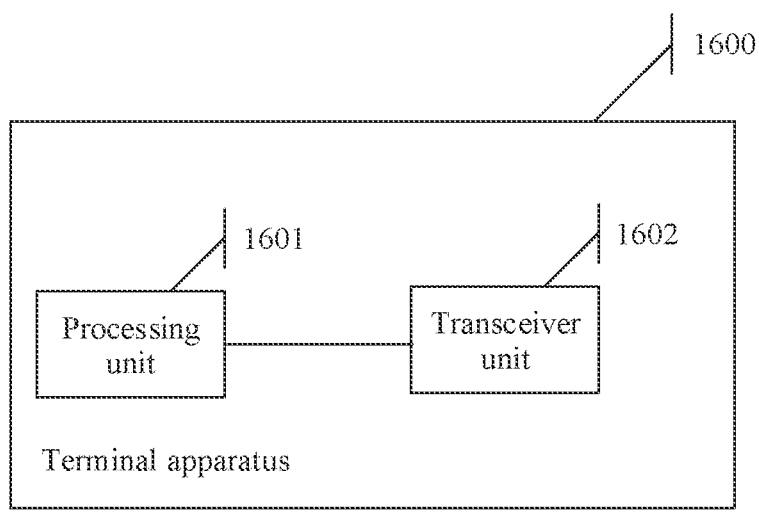
FIG. 16 is a schematic structural diagram of a terminal apparatus according to an embodiment of the present invention.

Based on a same inventive concept as the method embodiments, an embodiment of this application further provides a terminal apparatus, configured to perform the method performed by the terminal in the foregoing method embodiments. For a related feature, refer to the foregoing method embodiments. Details are not described herein again. As shown in FIG. 16, the terminal apparatus 1600 includes a processing unit 1601 and a transceiver unit 1602.

It should be noted that the apparatus shown in FIG. 16 may be an entire terminal or an entire network device, may be a component or a combination of a plurality of components that can perform the following method procedure in the terminal or the network device, may be a chip that can implement the following method procedure in the terminal or the network device, or the like. This is not limited in this embodiment of this application.

The processing unit 1601 is configured to obtain first indication information, where the first indication information is used to indicate a first time domain resource to be used by the terminal apparatus to send or receive first information on a first link.

The processing unit 1601 is further configured to obtain second indication information, where the second indication information is used to indicate a second time domain resource to be used by the terminal apparatus to send or receive second information on a second link.

The processing unit 1601 is further configured to: when the first time domain resource overlaps with the second time domain resource, trigger, after first duration, the transceiver unit 1602 to send or receive the second information on the second time domain resource, and/or trigger, after first duration, the transceiver unit 1602 to stop receiving or sending of the first information on the first time domain resource. Alternatively, the processing unit 1601 is further configured to: when the first time domain resource overlaps with the second time domain resource, trigger, within first duration, the transceiver unit 1602 to send or receive the second information on the second time domain resource, and/or trigger, within first duration, the transceiver unit 1602 to stop receiving or sending of the first information on the first time domain resource.

The transceiver unit 1602 may be a receiving unit and a sending unit. Specifically, that the transceiver unit 1602 sends or receives the first information on the second time domain resource includes: The receiving unit receives the first information on the second time domain resource, or the sending unit sends the first information on the second time domain resource. That the transceiver unit 1602 stops receiving or sending of the first information on the first time domain resource includes: The receiving unit stops receiving of the first information on the first time domain resource, or the sending unit stops sending of the second information on the first time domain resource.

In a possible implementation, the processing unit 1601 is specifically configured to trigger, after the first duration, the transceiver unit 1602 to stop receiving or sending of the first information on an overlapping resource between the first time domain resource and the second time domain resource.

In a possible implementation, the processing unit 1601 is specifically configured to trigger, within the first duration, the transceiver unit 1602 to stop receiving or sending of the first information on the overlapping resource between the first time domain resource and the second time domain resource.

In a possible implementation, the first link is a cellular link, and the second link is a sidelink; the first link is a sidelink, and the second link is a cellular link; the first link is a backhaul link, and the second link is an access link; or the first link is an access link, and the second link is a backhaul link.

In a possible implementation, the first link is a link in a first communications system, and the second link is a link in a second communications system. The first communications system is an LTE system, and the second communications system is a 5G system; the first communications system is a 5G system, and the second communications system is an LTE system; or the first communications system is a 5G system, and the second communications system is a 5G system.

In a possible implementation, the first duration is first preparation duration of the first information, first preparation duration of the second information, or a minimum value of the first preparation duration and the second preparation duration.

In a possible implementation, the first time domain resource is at least one first slot, and the second time domain resource is at least one second slot; the first time domain resource is at least one first symbol, and the second time domain resource is at least one second symbol; the first time domain resource is M symbols in at least one first slot, and the second time domain resource is N symbols in at least one second slot, where M is an integer greater than or equal to 1, and N is an integer greater than or equal to 1; the first time domain resource is at least one first slot, and the second time domain resource is at least one second symbol; or the first time domain resource is at least one first symbol, and the second time domain resource is at least one second slot.

In the embodiments of this application, division into the units is an example and is merely logical function division, and may be other division in an actual implementation. In addition, functional units in the embodiments of this application may be integrated into one processor, may exist alone physically, or two or more units may be integrated into one module. The foregoing integrated units may be implemented in a form of hardware, or may be implemented in a form of a software functional module.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a terminal device (which may be a personal computer, a mobile phone, a network device, or the like) or a processor (processor) to perform all or some of the steps of the methods in the embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

In the embodiments of this application, the terminal apparatus may be presented in a form of functional modules obtained through division in an integrated manner. The "module" herein may be a specific ASIC, a circuit, a processor that executes one or more software or firmware programs and a memory, an integrated logic circuit, and/or another component that can provide the foregoing functions.

Figure 17:
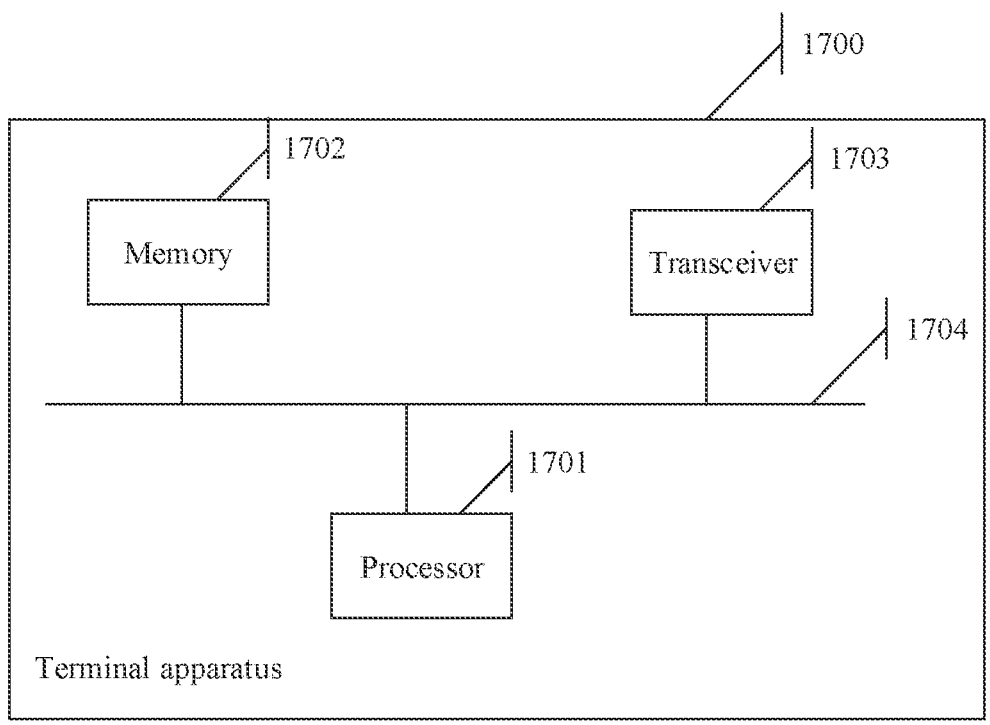
FIG. 17 is a schematic structural diagram of a terminal apparatus according to an embodiment of the present invention.

Based on a same inventive concept as the method embodiments, an embodiment of this application further provides a communication apparatus, configured to perform the method performed by the terminal device in the foregoing method embodiments. For a related feature, refer to the foregoing method embodiments. Details are not described herein again. As shown in FIG. 17, the terminal apparatus 1700 includes at least one processor 1701, a memory 1702, and a transceiver 1703. It should be noted that the apparatus shown in FIG. 17 may be an entire terminal or an entire network device, may be a component or a combination of a plurality of components that can perform the following method procedure in the terminal or the network device, may be a chip system that can implement the following method procedure in the terminal or the network device, or the like. This is not limited in this embodiment of this application.

The memory 1702 may be a volatile memory such as a random access memory. Alternatively, the memory may be a nonvolatile memory such as a read-only memory, a flash memory, a hard disk drive (hard disk drive, HDD), or a solid-state drive (solid-state drive, SSD). Alternatively, the memory 1702 is any other medium that can be used to carry or store expected program code in a form of an instruction or a data structure and that can be accessed by a computer. However, this is not limited thereto. The memory 1702 may be a combination of the foregoing memories.

A specific connection medium between the processor 1701 and the memory 1702 is not limited in this embodiment of this application. In this embodiment of this application, the memory 1702 is connected to the processor 1701 through a bus 1704 in the figure. The bus 1704 is represented by one thick line in the figure. A connection manner between other components is merely used as an example for description, and is not limited thereto. The bus 1704 may be classified into an address bus, a data bus, a control bus, and the like. For ease of representation, only one thick line is used to represent the bus in FIG. 17, but this does not mean that there is only one bus or only one type of bus.

The transceiver 1703 is configured to receive/transmit data. For example, the transceiver 1703 may include a receiver and a transmitter. The processor 1701 may communicate with another device by using the transceiver 1703.

The receiver may be configured to perform the step in which the terminal receives the first information from the network device in S601$a$, S601$b$2, S602$a$, S602$b$2 and S604 in the embodiment shown in FIG. 6, and/or configured to support another process of the technology described in this specification. The transmitter may be configured to perform the step in which the terminal sends the first information to the network device in S604 in the embodiment shown in FIG. 6, and/or configured to support another process of the technology described in this specification. The processor 1701 may be configured to perform S603 and S605 in the embodiment shown in FIG. 6, and/or configured to support another process of the technology described in this specification. All related content of the steps in the foregoing method embodiments may be cited in function descriptions of the corresponding functional modules. Details are not described herein again.

Alternatively, the receiver may be configured to perform the step in which the terminal receives the second information from the network device in S901$a$, S901$b$2, S902$a$, S902$b$2 and S904 in the embodiment shown in FIG. 9, and/or configured to support another process of the technology described in this specification. The transmitter may be configured to perform the step in which the terminal sends the second information to the network device in S904 in the embodiment shown in FIG. 9, and/or configured to support another process of the technology described in this specification. The processor 1701 may be configured to perform S903, S904, and S905 in the embodiment shown in FIG. 9, and/or configured to support another process of the technology described in this specification. All related content of the steps in the foregoing method embodiments may be cited in function descriptions of the corresponding functional modules. Details are not described herein again.

Alternatively, the transceiver 1703 may be configured to perform S1201$a$, S1201$b$2, S1202$a$, S1202$b$2, and the step in which the terminal sends the second information to the network device in S1204 in the embodiment shown in FIG. 12, and/or configured to support another process of the technology described in this specification. The transmitter may be configured to perform the step in which the terminal receives the second information from the network device in S1204 in the embodiment shown in FIG. 12, and/or configured to support another process of the technology described in this specification. The processor 1701 may be configured to perform S1203 and S1205 in the embodiment shown in FIG. 12, and/or configured to support another process of the technology described in this specification. All related content of the steps in the foregoing method embodiments may be cited in function descriptions of the corresponding functional modules. Details are not described herein again.

Alternatively, the receiver may be configured to perform S1401$a$, S1401$b$2, S1402$a$, S1402$b$2, and S1403 in the embodiment shown in FIG. 14, and/or configured to support another process of the technology described in this specification. The processor 1701 may be configured to perform S1403, S1404, and S1405 in the embodiment shown in FIG.

14, and/or configured to support another process of the technology described in this specification. All related content of the steps in the foregoing method embodiments may be cited in function descriptions of the corresponding functional modules. Details are not described herein again.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the claims of this application and equivalent technologies thereof.

What is claimed is:

1. A communication method, wherein the communication method comprises:
    obtaining, by a terminal apparatus, first indication information, wherein the first indication information is used to indicate a first time domain resource to be used by the terminal apparatus to send or receive first information on a first link;
    obtaining, by the terminal apparatus, second indication information, wherein the second indication information is used to indicate a second time domain resource to be used by the terminal apparatus to send or receive second information on a second link; and
    when the first time domain resource overlaps with the second time domain resource, performing following operations:
        sending or receiving, by the terminal apparatus, the first information on the first time domain resource; and
        canceling, by the terminal apparatus, receiving or sending of the second information on the second time domain resource; and
    when the first time domain resource overlaps with a third time domain resource, performing at least one of following operations:
        sending or receiving, by the terminal apparatus, the first information on the first time domain resource; or
        canceling, by the terminal apparatus, receiving or sending of the second information on the second time domain resource, wherein an end time point of the third time domain resource is a start time point of the second time domain resource.

2. The communication method according to claim 1, wherein:
    the first link is a cellular link, and the second link is a sidelink; or
    the first link is a backhaul link, and the second link is an access link.

3. The communication method according to claim 1, wherein the first indication information is used to indicate the first time domain resource to be used by the terminal apparatus to receive the first information on the first link, and the first information comprises at least one of the following information:
    a synchronization signal block (SS) block, a physical broadcast channel block (PBCH) block, synchronization information, or a control resource set (CORESET).

4. The communication method according to claim 1, wherein the first indication information is used to indicate the first time domain resource to be used by the terminal apparatus to send the first information on the first link, and the first information comprises at least one of the following information:
    information carried on a physical random access channel (PRACH) or ultra-reliable and low-latency communication (URLLC) data.

5. The communication method according to claim 1, wherein the second link is a sidelink, the second indication information is used to indicate the second time domain resource to be used by the terminal apparatus to send or receive the second information on the second link, and the second information comprises at least one of the following information:
    information carried on a physical sidelink shared channel (PSSCH), information carried on a physical sidelink control channel (PSCCH), a sidelink sounding reference signal (SL-SRS), a sidelink channel state information reference signal (SL-CSI-RS), or information carried on a physical sidelink feedback channel (PSFCH).

6. The communication method according to claim 1, wherein:
    the first link is a sidelink, and the second link is a cellular link; or
    the first link is an access link, and the second link is a backhaul link.

7. The communication method according to claim 1, wherein the first link is a sidelink, the first indication information is used to indicate the first time domain resource to be used by the terminal apparatus to send or receive the first information on the first link, and the first information comprises at least one of the following information:
  information carried on a PSSCH, information carried on a PSCCH, an SL-SRS, an SL-CSI-RS, or information carried on a PSFCH.

8. The communication method according to claim 1, wherein the second indication information is used to indicate the second time domain resource to be used by the terminal apparatus to send the second information on the second link, and the second information comprises at least one of the following information:
  a sounding reference signal (SRS), information carried on a physical uplink control channel (PUCCH), or information carried on a physical uplink shared channel (PUSCH).

9. The communication method according to claim 1, wherein the second indication information is used to indicate the second time domain resource to be used by the terminal apparatus to receive the second information on the second link, and the second information comprises at least one of the following information:
  a channel state information reference signal (CSI-RS) or a demodulation reference signal (DMRS).

10. The communication method according to claim 1, wherein:
  the first link is a link in a first communications system, and the second link is a link in a second communications system, wherein
  the first communications system is a Long-Term Evolution (LTE) system, and the second communications system is a 5G system;
  the first communications system is a 5G system, and the second communications system is an LTE system; or
  the first communications system is a 5G system, and the second communications system is a 5G system.

11. A terminal apparatus, comprising:
  at least one processor; and
  one or more memories coupled to the at least one processor and storing programming instructions for execution by the at least one processor to:
    obtain first indication information, wherein the first indication information is used to indicate a first time domain resource to be used by the terminal apparatus to send or receive first information on a first link;
    obtain second indication information, wherein the second indication information is used to indicate a second time domain resource to be used by the terminal apparatus to send or receive second information on a second link; and
    when the first time domain resource overlaps with the second time domain resource, perform following operations:
      send or receive the first information on the first time domain resource; and
      cancel receiving or sending of the second information on the second time domain resource; and
    when the first time domain resource overlaps with a third time domain resource, perform at least one of following operations:
      send or receive the first information on the first time domain resource; or
      cancel receiving or sending of the second information on the second time domain resource, wherein an end time point of the third time domain resource is a start time point of the second time domain resource.

12. The terminal apparatus according to claim 11, wherein:
  the first link is a cellular link, and the second link is a sidelink; or
  the first link is a backhaul link, and the second link is an access link.

13. The terminal apparatus according to claim 11, wherein the first indication information is used to indicate the first time domain resource to be used by the terminal apparatus to receive the first information on the first link, and the first information comprises at least one of the following information:
  a synchronization signal block (SS) block, a physical broadcast channel block (PBCH) block, synchronization information, or a control resource set (CORESET).

14. The terminal apparatus according to claim 11, wherein the first indication information is used to indicate the first time domain resource to be used by the terminal apparatus to send the first information on the first link, and the first information comprises at least one of the following information:
  information carried on a physical random access channel (PRACH) or ultra-reliable and low-latency communication (URLLC) data.

15. The terminal apparatus according to claim 11, wherein the second link is a sidelink, the second indication information is used to indicate the second time domain resource to be used by the terminal apparatus to send or receive the second information on the second link, and the second information comprises at least one of the following information:
  information carried on a physical sidelink shared channel (PSSCH), information carried on a physical sidelink control channel (PSCCH), a sidelink sounding reference signal (SL-SRS), a sidelink channel state information reference signal (SL-CSI-RS), or information carried on a physical sidelink feedback channel (PSFCH).

16. The terminal apparatus according to claim 11, wherein:
  the first link is a sidelink, and the second link is a cellular link; or
  the first link is an access link, and the second link is a backhaul link.

17. The terminal apparatus according to claim 11, wherein the first link is a sidelink, the first indication information is used to indicate the first time domain resource to be used by the terminal apparatus to send or receive the first information on the first link, and the first information comprises at least one of the following information:
  information carried on a PSSCH, information carried on a PSCCH, an SL-SRS, an SL-CSI-RS, or information carried on a PSFCH.

18. The terminal apparatus according to claim 11, wherein the second indication information is used to indicate the second time domain resource to be used by the terminal apparatus to send the second information on the second link, and the second information comprises at least one of the following information:
  a sounding reference signal (SRS), information carried on a physical uplink control channel (PUCCH), or information carried on a physical uplink shared channel (PUSCH).

19. The terminal apparatus according to claim 11, wherein the second indication information is used to indicate the second time domain resource to be used by the terminal apparatus to receive the second information on the second link, and the second information comprises at least one of the following information:
   a channel state information reference signal (CSI-RS) or a demodulation reference signal (DMRS).

20. The terminal apparatus according to claim 11, wherein:
   the first link is a link in a first communications system, and the second link is a link in a second communications system, wherein
   the first communications system is a Long-Term Evolution (LTE) system, and the second communications system is a 5G system;
   the first communications system is a 5G system, and the second communications system is an LTE system; or
   the first communications system is a 5G system, and the second communications system is a 5G system.

* * * * *